(12) United States Patent
Katou et al.

(10) Patent No.: US 8,964,096 B2
(45) Date of Patent: Feb. 24, 2015

(54) IMAGING LENS AND IMAGING DEVICE

(71) Applicant: Sony Corporation, Tokyo (JP)

(72) Inventors: Kouji Katou, Saitama (JP); Yumiko Uehara, Tokyo (JP)

(73) Assignee: Sony Corporation, Tokyo (JP)

( * ) Notice: Subject to any disclaimer, the term of this patent is extended or adjusted under 35 U.S.C. 154(b) by 20 days.

(21) Appl. No.: 13/962,036

(22) Filed: Aug. 8, 2013

(65) Prior Publication Data

US 2014/0092271 A1 Apr. 3, 2014

(30) Foreign Application Priority Data

Oct. 2, 2012 (JP) ................................ 2012-220629

(51) Int. Cl.
*H04N 5/225* (2006.01)
*G02B 13/18* (2006.01)
*G02B 9/08* (2006.01)

(52) U.S. Cl.
CPC . *G02B 9/08* (2013.01); *G02B 13/18* (2013.01)
USPC ............................ 348/340; 359/717; 359/794

(58) Field of Classification Search
USPC .................................. 348/340; 359/717, 794
See application file for complete search history.

(56) References Cited

U.S. PATENT DOCUMENTS

| 5,930,056 | A   | * | 7/1999 | Ohashi ........................ 359/776 |
| 7,102,834 | B2  | * | 9/2006 | Karbe .......................... 359/760 |
| 7,706,087 | B2  | * | 4/2010 | Obama ......................... 359/794 |
| 7,944,625 | B2  | * | 5/2011 | Hatada .......................... 359/749 |
| 8,721,094 | B2  | * | 5/2014 | Tanaka et al. ................. 359/601 |
| 2011/0115963 | A1 | * | 5/2011 | Sueyoshi ..................... 348/340 |

FOREIGN PATENT DOCUMENTS

JP      2010-072359      4/2010
JP      2011-113052      6/2011

* cited by examiner

*Primary Examiner* — Ngoc-Yen Vu
(74) *Attorney, Agent, or Firm* — Rader, Fishman & Grauer PLLC

(57) ABSTRACT

An imaging lens satisfies the following conditional expression (1) and is configured by disposing a first lens group that has a positive refractive power, an aperture stop, and a second lens group that has a positive refractive power in order from an object side to an image side. The first and second lens groups are moved from the image side to the object side in a state in which a gap between the lens groups is constant on an optical axis when a subject distance changes from infinity to approach, and the second lens group is configured by at least two negative lenses and at least three positive lenses.

$$0.01 < f2/f1 < 0.23 \qquad (1)$$

where,
f1: focal length of the first lens group when focused on an object at infinity
f2: focal length of the second lens group when focused on an object at infinity.

9 Claims, 13 Drawing Sheets

IMAGING LENS AND IMAGING DEVICE

BACKGROUND

The present disclosure relates to a technical field of an imaging lens and an imaging device. More specifically, the present disclosure relates to a technical field of an imaging lens that uses a whole lens extension system, and in particular, is suitable for use in a single-lens reflex camera, a video camera or the like and an imaging device that uses such an imaging lens.

In the related art, so-called double-Gauss type imaging lenses in which symmetric lens groups are disposed on an object side and an image side with an aperture stop interposed therebetween are presented in large numbers as large-aperture standard lenses (imaging lenses) that are used in imaging devices such as still cameras and video cameras (for example, refer to Japanese Unexamined Patent Application Publication No. 2011-113052 and Japanese Unexamined Patent Application Publication No. 2010-72359).

SUMMARY

However, Example 1, Example 4 and Example 5 of the imaging lenses disclosed in Japanese Unexamined Patent Application Publication No. 2011-113052 perform the correction of aberration by adding a lens to the large-aperture standard lenses of the related art with one negative lens and three positive lenses in a lens configuration between the image side and the aperture stop, but there is a problem in that the correction of spherical aberration and comatic aberration is insufficient. In addition, since Example 2, Example 3 and Example 7 of the imaging lenses disclosed in Japanese Unexamined Patent Application Publication No. 2011-113052 have the same number of lenses as the abovementioned large-aperture standard lenses of the related art, there is a problem in that the correction of off-axis comatic aberration is insufficient.

Meanwhile, Example 1 of the imaging lenses disclosed in Japanese Unexamined Patent Application Publication No. 2010-72359 is configured by two negative lenses and three positive lenses in a lens configuration between the image side and the aperture stop, but there is a problem in that the correction of comatic aberration in a sagittal direction is insufficient. In addition, since Example 2 and Example 3 of the imaging lenses disclosed in Japanese Unexamined Patent Application Publication No. 2010-72359 have the same number of lenses as the abovementioned large-aperture standard lenses of the related art, there is a problem in that the correction of off-axis comatic aberration is insufficient.

Therefore, it is desirable that an imaging lens and an imaging device according to embodiments of the present disclosure overcome the abovementioned problems and secure favorable imaging performance at infinity by favorably correcting various types of aberration.

According to an embodiment of the present disclosure, there is provided an imaging lens that satisfies the following conditional expression (1) and is configured by disposing a first lens group that has a positive refractive power, an aperture stop, and a second lens group that has a positive refractive power in order from an object side to an image side, in which the first lens group and the second lens group are moved from the image side to the object side in a state in which a gap between the lens groups is constant on an optical axis when a subject distance changes from infinity to approach, and the second lens group is configured by at least two negative lenses and at least three positive lenses.

$$0.01 < f2/f1 < 0.23 \tag{1}$$

where,
f1: focal length of the first lens group when focused on an object at infinity
f2: focal length of the second lens group when focused on an object at infinity Therefore, in the imaging lens, the respective refractive powers of first lens group and the second lens group can be adjusted.

In the abovementioned imaging lens, it is preferable that the second lens group be configured by an object side lens group that is a cemented lens having a negative refractive power, and an image side lens group that has a positive refractive power that are disposed in order from the object side to the image side.

As a result of the second lens group being configured by an object side lens group that is a cemented lens having a negative refractive power, and an image side lens group that has a positive refractive power that are disposed in order from the object side to the image side, in addition to securing a sufficient amount of back focus necessary in a single-lens reflex camera, various types of aberration can be favorably corrected.

In the abovementioned imaging lens, it is preferable that the object side lens group be configured by a negative lens and a positive lens that are disposed in order from the object side to the image side.

As a result of the object side lens group being configured by a negative lens and a positive lens that are disposed in order from the object side to the image side, the object side lens group can be configured as a cemented lens of a negative lens and a positive lens that are disposed in order from the object side to the image side, and light beams on an axis that is directed from the first lens group to the second lens group attain a substantially afocal state.

In the abovementioned imaging lens, it is preferable that the image side lens group be configured by two positive lenses and one negative lens.

As a result of the object side lens group being configured by a negative lens and a positive lens, and the image side lens group being configured by two positive lenses and one negative lens, three positive lenses can be disposed in the second lens group.

In the abovementioned imaging lens, it is preferable that the imaging lens satisfy the following conditional expression (2).

$$-6.0 < f2F/f2 < -1.0 \tag{2}$$

where,
f2F: focal length of the object side lens group when focused on an object at infinity As a result of the imaging lens satisfying the conditional expression (2), a ratio of the focal length of the second lens group when focused on an object at infinity and the focal length of the object side lens group can be adjusted.

In the abovementioned imaging lens, it is preferable that at least one aspherical lens be included in the second lens group.

As a result of at least one aspherical lens being included in the second lens group, comatic aberration can be corrected by an aspherical lens.

According to another embodiment of the present disclosure, there is provided an imaging lens that is configured by disposing a first lens group that has a positive refractive power, an aperture stop, and a second lens group that has a positive refractive power in order from an object side to an image side, in which the first lens group and the second lens group are moved from the image side to the object side in a state in which a gap between the lens groups is constant on an optical axis when a subject distance changes from infinity to approach, the second lens group is configured by an object side lens group that is a cemented lens having a negative refractive power, and an image side lens group that has a positive refractive power that are disposed in order from the object side to the image side, and the image side lens group is configured by two positive lenses and one negative lens.

Therefore, in this imaging lens, in addition to securing a sufficient amount of back focus necessary in a single-lens reflex camera, various types of aberration can be favorably corrected.

According to still another embodiment of the present disclosure, there is provided an imaging device including an imaging lens and an imaging element that converts an optical image formed by the imaging lens into an electrical signal, in which the imaging lens satisfies the following conditional expression (1), and is configured by disposing a first lens group that has a positive refractive power, an aperture stop, and a second lens group that has a positive refractive power in order from an object side to an image side, the first lens group and the second lens group are moved from the image side to the object side in a state in which a gap between the lens groups is constant on an optical axis when a subject distance changes from infinity to approach, and the second lens group is configured by at least two negative lenses and at least three positive lenses.

$$0.01 < f2/f1 < 0.23 \tag{1}$$

where, f1: focal length of the first lens group when focused on an object at infinity f2: focal length of the second lens group when focused on an object at infinity Therefore, in the imaging lens of the imaging device, the respective refractive powers of first lens group and the second lens group can be adjusted.

According to still another embodiment of the present disclosure, there is provided an imaging device including an imaging lens and an imaging element that converts an optical image formed by the imaging lens into an electrical signal, in which the imaging lens is configured by disposing a first lens group that has a positive refractive power, an aperture stop, and a second lens group that has a positive refractive power in order from an object side to an image side, the first lens group and the second lens group are moved from the image side to the object side in a state in which a gap between the lens groups is constant on an optical axis when a subject distance changes from infinity to approach, the second lens group is configured by an object side lens group that is a cemented lens having a negative refractive power, and an image side lens group that has a positive refractive power that are disposed in order from the object side to the image side, and the image side lens group is configured by two positive lenses and one negative lens.

Therefore, in the imaging lens of this imaging device, in addition to securing a sufficient amount of back focus necessary in a single-lens reflex camera, various types of aberration can be favorably corrected.

The imaging lens according to an embodiment of the present disclosure satisfies the following conditional expression (1) and is configured by disposing a first lens group that has a positive refractive power, an aperture stop, and a second lens group that has a positive refractive power in order from an object side to an image side, in which the first lens group and the second lens group are moved from the image side to the object side in a state in which a gap between the lens groups is constant on an optical axis when a subject distance changes from infinity to approach, and the second lens group is configured by at least two negative lenses and at least three positive lenses.

$$0.01 < f2/f1 < 0.23 \tag{1}$$

where, f1: focal length of the first lens group when focused on an object at infinity f2: focal length of the second lens group when focused on an object at infinity Therefore, the respective refractive powers of first lens group and the second lens group can be adjusted, it is possible to favorably correct comatic aberration, spherical aberration and field curvature, and it is possible to secure favorable imaging performance at infinity.

According to the embodiment of the present disclosure, the second lens group is configured by an object side lens group that is a cemented lens having a negative refractive power, and an image side lens group that has a positive refractive power that are disposed in order from the object side to the image side.

Therefore, in addition to securing a sufficient amount of back focus that is necessary in a single-lens reflex camera, it is possible to favorably correct comatic aberration and field curvature, and it is possible to favorably correct high-level spherical aberration by configuring the object side lens group that is close to the aperture stop as a cemented lens.

According to the embodiment of the present disclosure, the object side lens group is configured by a negative lens and a positive lens that are disposed in order from the object side to the image side.

As a result of the object side lens group being configured by a negative lens and a positive lens that are disposed in order from the object side to the image side, since the object side lens group is configured as a cemented lens of a negative lens and a positive lens that are disposed in order from the object side to the image side, it is possible for light beams on an axis that is directed from the first lens group to the second lens group to attain a substantially afocal state, and it is possible to suppress sensitivity.

According to the embodiment of the present disclosure, the image side lens group is configured by two positive lenses and one negative lens.

Therefore, it is possible to suppress the occurrence of spherical aberration and comatic aberration.

According to the embodiment of the present disclosure, the imaging lens satisfies the following conditional expression (2).

$$-6.0 < f2F/f2 < -1.0 \tag{2}$$

where, f2F: focal length of the object side lens group when focused on an object at infinity Therefore, it is possible to favorably correct various types of aberration, in particular, spherical aberration, comatic aberration and astigmatism, and it is possible to achieve simplification of production by reducing the sensitivity of the lenses.

According to the embodiment of the present disclosure, at least one aspherical lens is included in the second lens group.

Therefore, it is possible to favorably correct comatic aberration.

The imaging lens according to another embodiment of the present disclosure is configured by disposing a first lens group that has a positive refractive power, an aperture stop, and a second lens group that has a positive refractive power in order from an object side to an image side, in which the first lens group and the second lens group are moved from the image side to the object side in a state in which a gap between the lens groups is constant on an optical axis when a subject distance changes from infinity to approach, the second lens group is configured by an object side lens group that is a cemented lens having a negative refractive power, and an image side lens group that has a positive refractive power that are disposed in order from the object side to the image side, and the image side lens group is configured by two positive lenses and one negative lens.

Therefore, in addition to securing a sufficient amount of back focus that is necessary in a single-lens reflex camera, it is possible to favorably correct comatic aberration and field curvature, it is possible to favorably correct high-level spherical aberration by configuring the object side lens group that is close to the aperture stop as a cemented lens, and it is possible to secure favorable imaging performance at infinity.

The imaging device according to still another embodiment the present disclosure includes an imaging lens and an imaging element that converts an optical image formed by the imaging lens into an electrical signal, in which the imaging lens satisfies the following conditional expression (1), and is configured by disposing a first lens group that has a positive refractive power, an aperture stop, and a second lens group that has a positive refractive power in order from an object side to an image side, the first lens group and the second lens group are moved from the image side to the object side in a state in which a gap between the lens groups is constant on an optical axis when a subject distance changes from infinity to approach, and the second lens group is configured by at least two negative lenses and at least three positive lenses.

$$0.01 < f2/f1 < 0.23 \tag{1}$$

where,
f1: focal length of the first lens group when focused on an object at infinity
f2: focal length of the second lens group when focused on an object at infinity Therefore, the respective refractive powers of first lens group and the second lens group can be adjusted, it is possible to favorably correct comatic aberration, spherical aberration and field curvature, and it is possible to secure favorable imaging performance at infinity.

The imaging device according to still another embodiment of the present disclosure includes an imaging lens and an imaging element that converts an optical image formed by the imaging lens into an electrical signal, in which the imaging lens is configured by disposing a first lens group that has a positive refractive power, an aperture stop, and a second lens group that has a positive refractive power in order from an object side to an image side, the first lens group and the second lens group are moved from the image side to the object side in a state in which a gap between the lens groups is constant on an optical axis when a subject distance changes from infinity to approach, the second lens group is configured by an object side lens group that is a cemented lens having a negative refractive power, and an image side lens group that has a positive refractive power that are disposed in order from the object side to the image side, and the image side lens group is configured by two positive lenses and one negative lens.

Therefore, in addition to securing a sufficient amount of back focus that is necessary in a single-lens reflex camera, it is possible to favorably correct comatic aberration and field curvature, it is possible to favorably correct high-level spherical aberration by configuring the object side lens group that is close to the aperture stop as a cemented lens, and it is possible to secure favorable imaging performance at infinity.

DETAILED DESCRIPTION OF EMBODIMENTS

Figure 1:
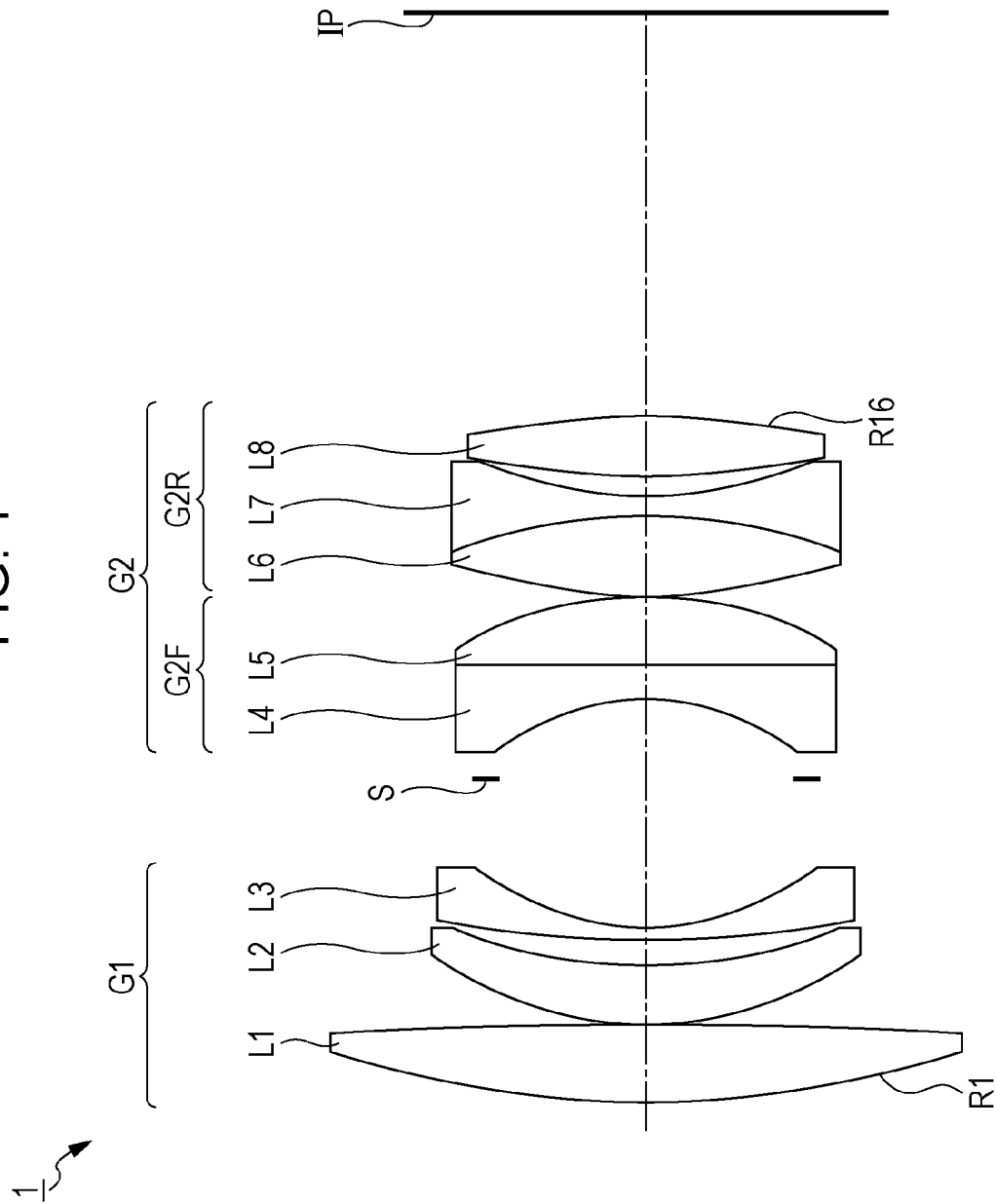
FIG. 1 is view that shows a lens configuration of a first embodiment of an imaging lens, and along with FIGS. 2 to 13, shows preferable embodiments for implementing an imaging lens and an imaging device according to the present disclosure.

Hereinafter, preferable embodiments for implementing the imaging lenses and the imaging device of the present disclosure will be described.

Configuration of Imaging Lens

An imaging lens of the present disclosure is configured by disposing a first lens group that has a positive refractive power, an aperture stop, and a second lens group that has a positive refractive power in order from an object side to an image side, and the first lens group and the second lens group are moved from the image side to the object side in a state in which a gap between the lens groups is constant on an optical axis when a subject distance changes from infinity to approach.

In addition, in the imaging lens of the present disclosure, the second lens group is configured by at least two negative lenses and at least three positive lenses and the imaging lens satisfies the following conditional expression (1).

$$0.01 < f2/f1 < 0.23 \tag{1}$$

where,
f1: focal length of the first lens group when focused on an object at infinity
f2: focal length of the second lens group when focused on an object at infinity Conditional expression (1) defines a ratio of the focal length of the second lens group when focused on an object at infinity with respect to the focal length of the first lens group when focused on an object at infinity.

If the ratio falls below a lower limit of conditional expression (1), the refractive power of the second lens group is too strong and the correction of comatic aberration is difficult. In addition, as a result of the refractive power of the second lens group being too strong, light rays are greatly bent, sensitivity is high, and the difficulty in the assembly of the lens is increased due to a high precision assembly technique being necessary.

Conversely, if the ratio exceeds an upper limit of conditional expression (1), the refractive power of the first lens group is too strong and the correction of spherical aberration is difficult. In addition, since the refractive power of the second lens group is relatively weak, the correction of field curvature is also difficult.

Therefore, as a result of the imaging lens satisfying conditional expression (1), the respective refractive powers of the first lens group and the second lens group can be adjusted, it is possible to favorably correct comatic aberration, spherical aberration and field curvature, and it is possible to achieve simplification of assembly.

Additionally, it is preferable that the imaging lens satisfy the following conditional expression (1)'.

$$0.05 < f2/f1 < 0.23 \tag{1}'$$

As a result of the imaging lens satisfying conditional expression (1)', the respective refractive powers of the first lens group and the second lens group can be further adjusted, it is possible to further favorably correct comatic aberration, spherical aberration and field curvature, and it is possible to achieve further simplification of assembly.

In the imaging lens according to an embodiment of the present disclosure, it is preferable that the second lens group be configured by an object side lens group that is a cemented lens having a negative refractive power, and an image side lens group that has a positive refractive power that are disposed in order from the object side to the image side.

As a result of the second lens group being configured by an object side lens group that is a cemented lens having a negative refractive power, and an image side lens group that has a positive refractive power that are disposed in order from the object side to the image side, in addition to securing a sufficient amount of back focus necessary in a single-lens reflex camera, comatic aberration and field curvature can be favorably corrected.

In addition, it is possible to favorably correct high-level spherical aberration by configuring the object side lens group that is close to the aperture stop as a cemented lens.

In the imaging lens according to an embodiment of the present disclosure, it is preferable that the object side lens group be configured by a negative lens and a positive lens that are disposed in order from the object side to the image side.

As a result of the object side lens group being configured by a negative lens and a positive lens that are disposed in order from the object side to the image side, since the object side lens group is configured as a cemented lens of a negative lens and a positive lens that are disposed in order from the object side to the image side, it is possible for light beams on an axis that is directed from the first lens group to the second lens group to attain a substantially afocal state, and it is possible to suppress sensitivity.

In the imaging lens according to an embodiment of the present disclosure, it is preferable that the image side lens group be configured by two positive lenses and one negative lens.

As a result of the object side lens group being configured by a negative lens and a positive lens, and the image side lens group being configured by two positive lenses and one negative lens, three positive lenses can be disposed in the second lens group, and it is possible to suppress the occurrence of spherical aberration or comatic aberration.

It is preferable that the imaging lens according to an embodiment of the present disclosure satisfy the following conditional expression (2).

$$-6.0 < f2F/f2 < -1.0 \tag{2}$$

where,
f2F: focal length of the object side lens group when focused on an object at infinity Conditional expression (2) defines a ratio of the focal length of the object side lens group when focused on an object at infinity with respect to the focal length of the second lens group when focused on an object at infinity.

If the ratio falls below a lower limit of conditional expression (2), the refractive power of the object side lens group becomes too weak and it is no longer possible to correct high-level spherical aberration that should be corrected by a cemented lens (object side lens group) that has a negative refractive power.

Conversely, if the ratio exceeds an upper limit of conditional expression (2), the refractive power of the object side lens group becomes too strong, the refractive power of the image side lens group has to be increased in order to secure the back focus that is necessary in a single-lens reflex camera, and the correction of comatic aberration and astigmatism becomes difficult. In addition, the sensitivity of the lens is increased and production thereof becomes more difficult.

Therefore, as a result of the imaging lens satisfying conditional expression (2), it is possible to favorably correct various types of aberration, in particular, spherical aberration, comatic aberration and astigmatism, and it is possible to achieve simplification of production by reducing the sensitivity of the lenses.

Additionally, it is preferable that the imaging lens satisfy the following conditional expression (2)'.

$$-5.5 < f2F/f2 < -1.5 \tag{2}'$$

As a result of the imaging lens satisfying conditional expression (2)', it is possible to further favorably correct various types of aberration, and it is possible to further achieve simplification of production by further reducing the sensitivity of the lenses.

In the imaging lens according to an embodiment of the present disclosure, it is preferable that at least one aspherical lens be included in the second lens group.

As a result of at least one aspherical lens being included in the second lens group, it is possible to favorably correct comatic aberration.

An imaging lens according to another embodiment of the present disclosure is configured by disposing a first lens group that has a positive refractive power, an aperture stop, and a second lens group that has a positive refractive power in order from an object side to an image side, and the first lens group and the second lens group are moved from the image side to the object side in a state in which a gap between the lens groups is constant on an optical axis when a subject distance changes from infinity to approach.

In addition, in the imaging lens according to another embodiment of the present disclosure, the second lens group is configured by an object side lens group that is a cemented lens having a negative refractive power, and an image side lens group that has a positive refractive power that are disposed in order from the object side to the image side, and the image side lens group is configured by two positive lenses and one negative lens.

As a result of the second lens group being configured by an object side lens group that is a cemented lens having a negative refractive power, and an image side lens group that has a positive refractive power that are disposed in order from the object side to the image side, in addition to securing a sufficient amount of back focus necessary in a single-lens reflex camera, comatic aberration and field curvature can be favorably corrected.

In addition, it is possible to favorably correct high-level spherical aberration by configuring the object side lens group that is close to the aperture stop as a cemented lens.

Numerical Examples of Imaging Lens

Hereinafter, specific embodiments of the imaging lens according to the present disclosure and numerical examples in which specific numerical values are used in the embodiments will be described with reference to drawings and tables.

Additionally, the meanings and the like of the symbols shown in the following tables and descriptions are as follows.

"Surface number" is the surface number of an $i^{th}$ surface counted from the object side to the image side, "R" is a paraxial curvature radius of the $i^{th}$ surface, "D" is an axial surface distance (thickness or air space at the center of the lens) between the $i^{th}$ surface and an $i+1^{th}$ surface, "Nd" is a refractive index at a d-line ($\lambda$=587.6 nm) of a lens starting from the $i^{th}$ surface or the like, "vd" is an Abbe number at a d-line of a lens starting from the $i^{th}$ surface or the like.

"ASP" with respect to a "surface number" indicates that the corresponding surface is aspherical, and "infinity" with respect to "R" indicates that the corresponding surface is flat.

"κ" indicates a conic constant, and "A4", "A6", "A8", and "A10" respectively indicate fourth order, sixth order, eighth order, and tenth order asphericity coefficients.

"f" indicates a focal length, "Fno" indicates an F number, "BF" indicates back focus, and "ω" indicates a half angle of view.

Additionally, in each of the tables below that indicate asphericity coefficients, "E-n" represents a decadic exponential expression, that is, "10 to the negative $n^{th}$ power", for example, "0.12345E-05" represents "0.12345×(10 to the negative $5^{th}$ power)".

There is a lens surface that is formed aspherically in the imaging lens used in each of the embodiments. The aspherical shape can be defined by the following mathematical expression 1 when "x" is a distance in a direction of an optical axis from the apex of the lens surface (sag amount), "y" is a height (image height) in a direction that is perpendicular to the optical axis, "c" is a paraxial curve at the apex of the lens (the inverse of the curvature radius), "κ" is a conic constant and "Ai" is an asphericity coefficient of each order.

$$x = \frac{y^2 \cdot c^2}{1 + \{1 - (1+k) \cdot y^2 \cdot c^2\}^{1/2}} + \Sigma A i \cdot y i \quad \text{Equation 1}$$

Imaging lens 1 to imaging lens 6 in a first embodiment to a sixth embodiment indicated below are configured by disposing a first lens group G1 that has a positive refractive power, an aperture stop S, and a second lens group G2 that has a positive refractive power in order from an object side to an image side.

First Embodiment

FIG. 1 shows a lens configuration of an imaging lens 1 in a first embodiment of the present disclosure.

In the imaging lens 1, the first lens group G1 and the second lens group G2 are moved from the image side to the object side in a state in which a gap between the lens groups is constant on an optical axis when a subject distance changes from infinity to approach.

The first lens group G1 is configured by disposing a bioconvex first lens L1 that has a positive refractive power, a meniscus-shaped second lens L2 that has a positive refractive power, a concave surface of which faces the image side, and a meniscus-shaped third lens L3 that has a negative refractive power, a concave surface of which faces the image side, in order from the object side to the image side.

The second lens group G2 is configured by disposing an object side lens group 2GF and an image side lens group 2GR in order from the object side to the image side.

The object side lens group 2GF has a negative refractive power. The object side lens group 2GF is configured by a cemented lens in which a bioconcave fourth lens L4 that has a negative refractive power and a bioconvex fifth lens L5 that has a positive refractive power and is disposed on the image side of the fourth lens L4, are bonded.

The image side lens group 2GR has a positive refractive power. The image side lens group 2GR is configured by disposing a cemented lens in which a bioconvex sixth lens L6 that has a positive refractive power and a bioconcave seventh lens L7 that has a negative refractive power and is disposed on the image side of the sixth lens L6, are bonded, and a bioconvex eighth lens L8 that has a positive refractive power in order from the object side to the image side.

The aperture stop S is disposed between the first lens group G1 and the second lens group G2. The aperture stop S is moved integrally with the second lens group G2 from the image side to the object side when a subject distance changes from infinity to approach.

An image surface IP is disposed on the image side of the second lens group G2.

Table 1 shows lens data for a numerical example 1 in which specific numerical values are used in the imaging lens 1 of the first embodiment.

TABLE 1

| Surface Number | R | D | Nd | vd |
|---|---|---|---|---|
| 1 (ASP) | 89.518 | 7.000 | 1.804200 | 46.5 |
| 2 | −886.343 | 0.200 | | |
| 3 | 33.496 | 5.000 | 1.910822 | 35.2 |
| 4 | 45.000 | 2.458 | | |
| 5 | 89.416 | 1.300 | 1.642830 | 33.9 |
| 6 | 24.240 | 13.579 | | |
| 7 | Infinity | 7.328 | | |
| 8 | −22.199 | 3.213 | 1.805181 | 25.4 |
| 9 | 481.795 | 6.474 | 1.834805 | 42.7 |
| 10 | −31.653 | 0.100 | | |
| 11 | 52.218 | 7.174 | 1.953500 | 32.3 |
| 12 | −53.221 | 1.924 | 1.713496 | 29.2 |
| 13 | 37.652 | 1.823 | | |

TABLE 1-continued

| Surface Number | R | D | Nd | vd |
|---|---|---|---|---|
| 14 | 76.660 | 5.428 | 1.802790 | 46.6 |
| 15 (ASP) | −71.767 | — | | |

In the imaging lens 1, an object side surface (a first surface) of the first lens L1 of the first lens group G1 and an image side surface (a fifteenth surface) of the eighth lens L8 of the second lens group G2 are formed aspherically. The asphericity coefficients A4, A6, A8 and A10 of the fourth order, sixth order, eighth order, and tenth order of the aspherical surfaces in numerical example 1 are shown in Table 2 along with the conic constants κ thereof.

TABLE 2

| Surface Number | κ | A4 | A6 | A8 | A10 |
|---|---|---|---|---|---|
| 1 | 0.0000 | −3.18E−07 | 3.52E−11 | 6.64E−15 | −5.65E−17 |
| 15 | 0.0000 | −1.96E−06 | −2.26E−10 | 5.13E−12 | −6.27E−15 |

A focal length f of the entire lens system when focused on an object at infinity, the F number Fno, the back focus BF and the half angle of view ω in numerical example 1 are shown in Table 3.

TABLE 3

| f | 49.4 |
|---|---|
| Fno | 1.44 |
| BF | 37.000 |
| ω | 24.06 |

Figure 2:
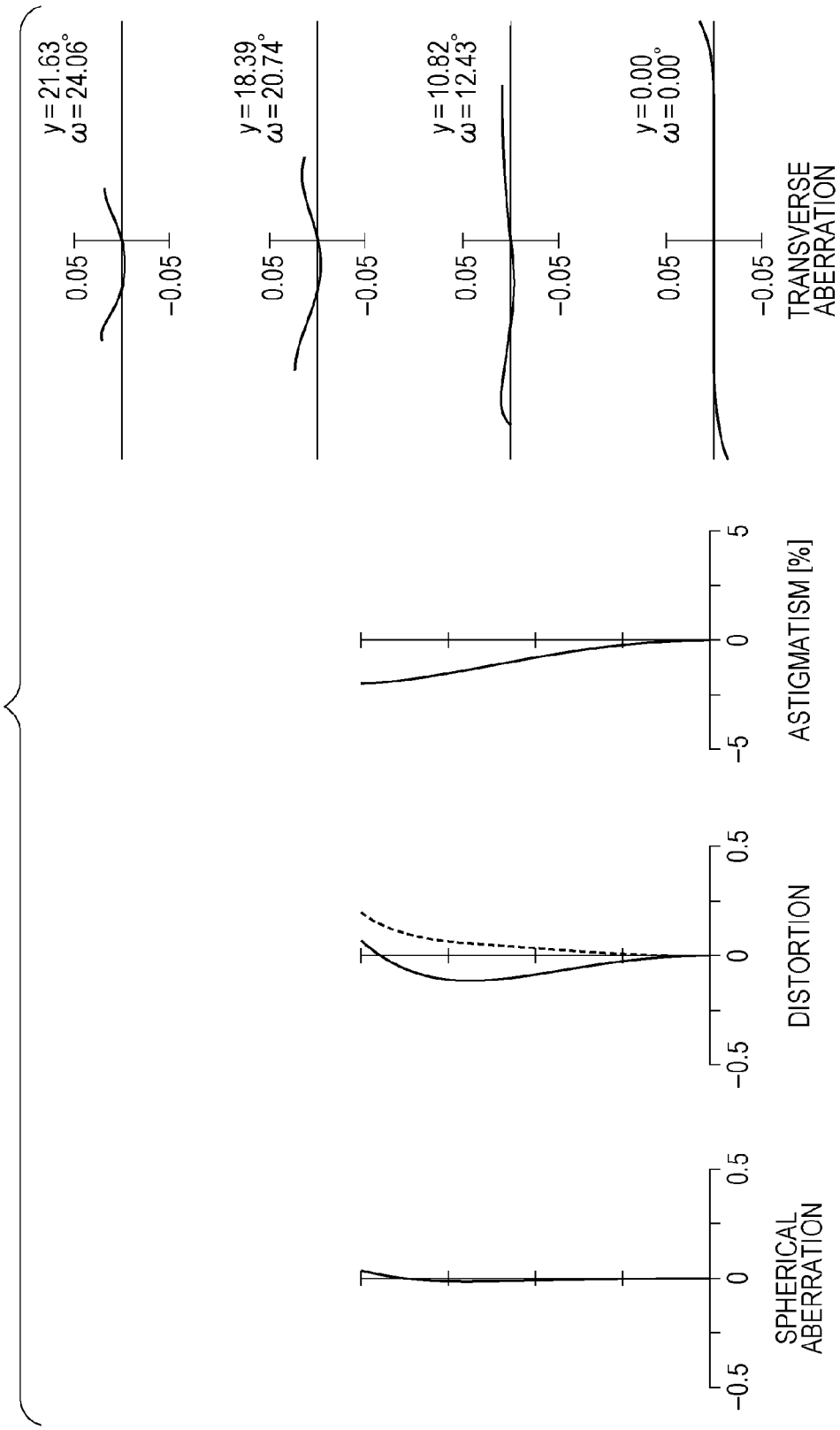
FIG. 2 is a view that shows spherical aberration, astigmatism, distortion and transverse aberration of numerical examples in which specific numerical values are used in the first embodiment.

FIG. 2 shows spherical aberration, astigmatism, distortion and transverse aberration when focused on an object at infinity in numerical example 1.

FIG. 2 shows a value of a d-line (587.56 nm) for spherical aberration, a value of a sagittal image surface of a d-line using a solid line and a value of a meridional image surface of a d-line using a dotted line for astigmatism, a value of a d-line for distortion, and a value of a d-line for transverse aberration. y indicates image height, and ω indicates a half angle of view for transverse aberration.

It is evident from each aberration drawing that various types of aberration are favorably corrected in numerical example 1 and that the numerical example has excellent imaging performance.

Second Embodiment

Figure 3:
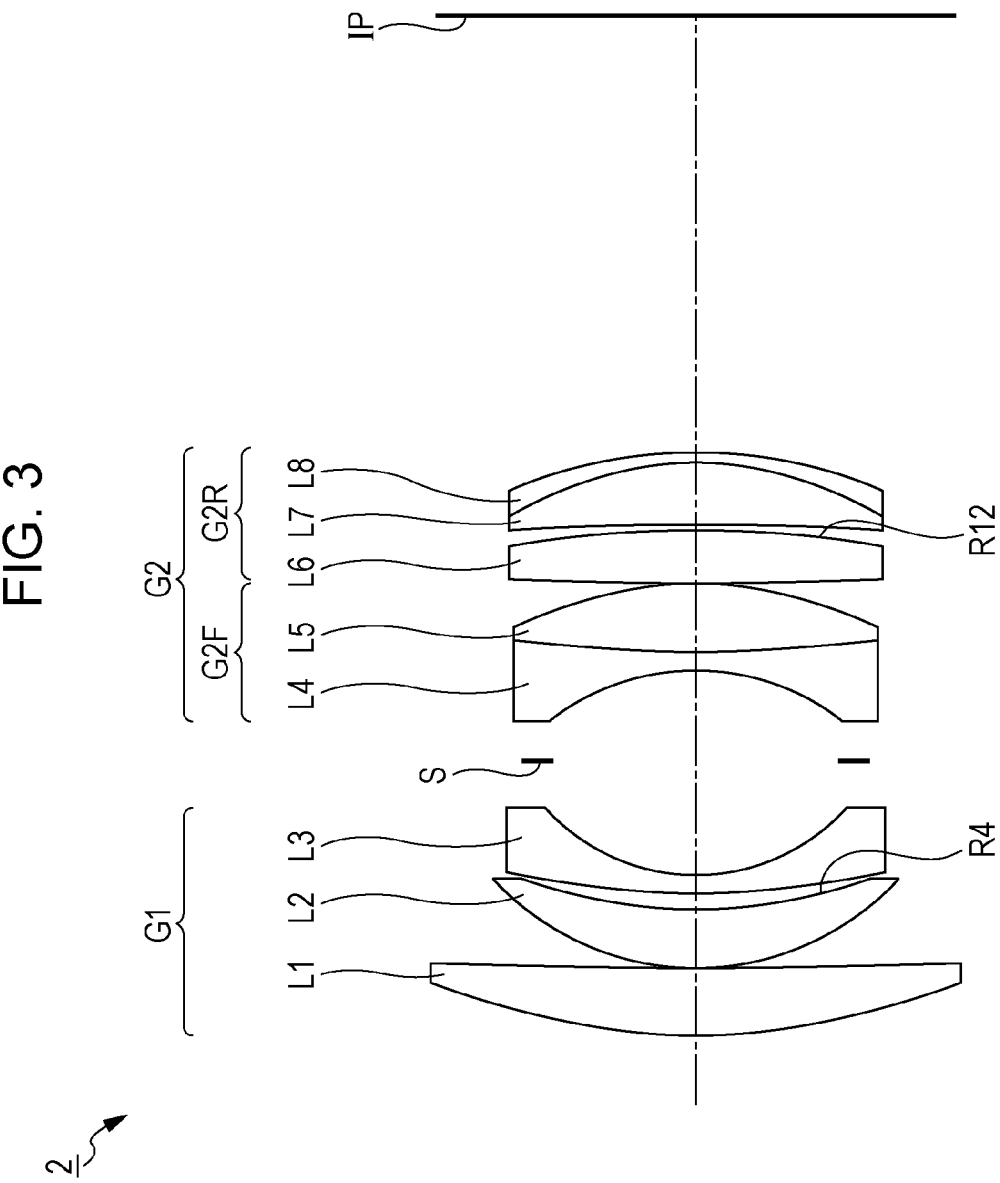
FIG. 3 is a view that shows a lens configuration of a second embodiment of an imaging lens.

FIG. 3 shows a lens configuration of an imaging lens 2 in a second embodiment of the present disclosure.

In the imaging lens 2, the first lens group G1 and the second lens group G2 are moved from the image side to the object side in a state in which a gap between the lens groups is constant on an optical axis when a subject distance changes from infinity to approach.

The first lens group G1 is configured by disposing a bioconvex first lens L1 that has a positive refractive power, a meniscus-shaped second lens L2 that has a positive refractive power, a concave surface of which faces the image side, and a meniscus-shaped third lens L3 that has a negative refractive power, a concave surface of which faces the image side, in order from the object side to the image side.

The second lens group G2 is configured by disposing an object side lens group 2GF and an image side lens group 2GR in order from the object side to the image side.

The object side lens group 2GF has a negative refractive power. The object side lens group 2GF is configured by a cemented lens in which a bioconcave fourth lens L4 that has a negative refractive power and a bioconvex fifth lens L5 that has a positive refractive power and is disposed on the image side of the fourth lens L4, are bonded.

The image side lens group 2GR has a positive refractive power. The image side lens group 2GR is configured by disposing a bioconvex sixth lens L6 that has a positive refractive power and a cemented lens in which a meniscus-shaped seventh lens L7 that has a positive refractive power, a convex surface of which faces the image side and a meniscus-shaped eighth lens L8 that has a negative refractive power, is disposed on the image side of the seventh lens L7 and a convex surface of which faces the image side, are bonded, in order from the object side to the image side.

The aperture stop S is disposed between the first lens group G1 and the second lens group G2. The aperture stop S is moved integrally with the second lens group G2 from the image side to the object side when a subject distance changes from infinity to approach.

An image surface IP is disposed on the image side of the second lens group G2.

Table 4 shows lens data for a numerical example 2 in which specific numerical values are used in the imaging lens 2 of the second embodiment.

TABLE 4

| Surface Number | R | D | Nd | vd |
|---|---|---|---|---|
| 1 | 57.429 | 5.744 | 1.834807 | 42.7 |
| 2 | 582.707 | 0.100 | | |
| 3 | 24.497 | 4.861 | 1.904599 | 35.4 |
| 4(ASP) | 42.170 | 1.500 | | |
| 5 | 78.280 | 1.600 | 1.761818 | 37.2 |
| 6 | 17.331 | 9.946 | | |
| 7 | Infinity | 7.607 | | |
| 8 | −21.793 | 1.800 | 1.846660 | 23.7 |
| 9 | 125.879 | 5.803 | 1.834810 | 42.7 |
| 10 | −35.453 | 0.200 | | |
| 11 | 757.383 | 4.500 | 1.910822 | 35.2 |
| 12(ASP) | −87.538 | 0.500 | | |
| 13 | −205.395 | 5.445 | 1.910822 | 35.2 |
| 14 | −30.329 | 1.000 | 1.761818 | 26.6 |
| 15 | −41.912 | — | | |

In the imaging lens 2, an image side surface (a fourth surface) of the second lens L2 of the first lens group G1 and an image side surface (a twelfth surface) of the sixth lens L6 of the second lens group G2 are formed aspherically. The asphericity coefficients A4, A6, A8 and A10 of the fourth order, sixth order, eighth order, and tenth order of the aspherical surfaces in numerical example 2 are shown in Table 5 along with the conic constants κ thereof.

TABLE 5

| Surface Number | κ | A4 | A6 | A8 | A10 |
|---|---|---|---|---|---|
| 4 | 0.0000 | −1.01E−06 | −9.23E−10 | −4.30E−12 | 1.53E−14 |
| 12 | 0.0000 | 2.53E−06 | −9.11E−10 | 1.21E−11 | −3.07E−14 |

A focal length f of the entire lens system when focused on an object at infinity, the F number Fno, the back focus BF and the half angle of view ω in numerical example 2 are shown in Table 6.

TABLE 6

| F | 51.5 |
|---|---|
| Fno | 1.44 |
| BF | 37.700 |
| ω | 23.32 |

Figure 4:
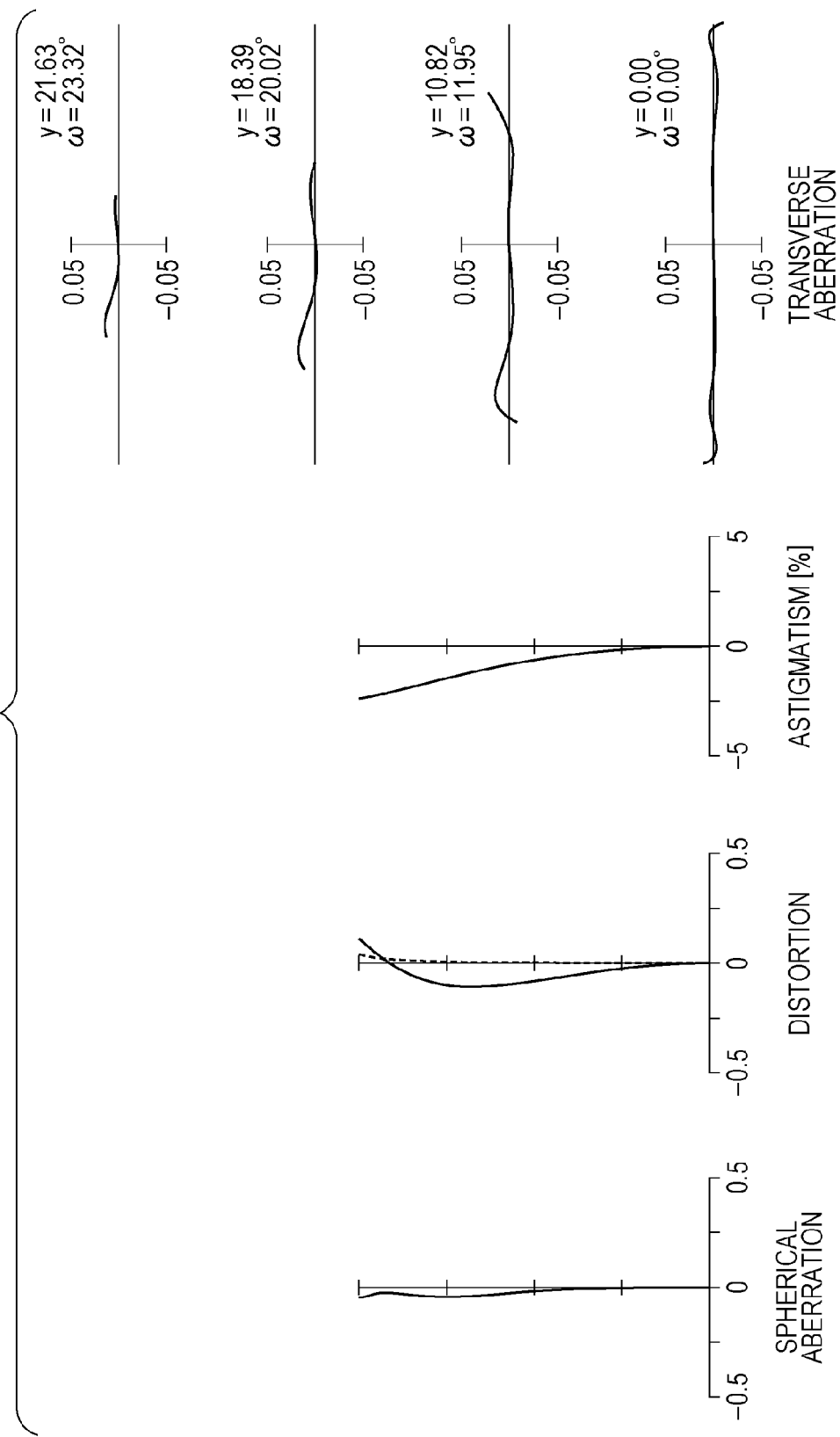
FIG. 4 is a view that shows spherical aberration, astigmatism, distortion and transverse aberration of numerical examples in which specific numerical values are used in the second embodiment.

FIG. 4 shows spherical aberration, astigmatism, distortion and transverse aberration when focused on an object at infinity in numerical example 2.

FIG. 4 shows a value of a d-line (587.56 nm) for spherical aberration, a value of a sagittal image surface of a d-line using a solid line and a value of a meridional image surface of a d-line using a dotted line for astigmatism, a value of a d-line for distortion, and a value of a d-line for transverse aberration. y indicates image height, and ω indicates a half angle of view for transverse aberration.

It is evident from each aberration drawing that various types of aberration are favorably corrected in numerical example 2 and that the numerical example has excellent imaging performance.

Third Embodiment

Figure 5:
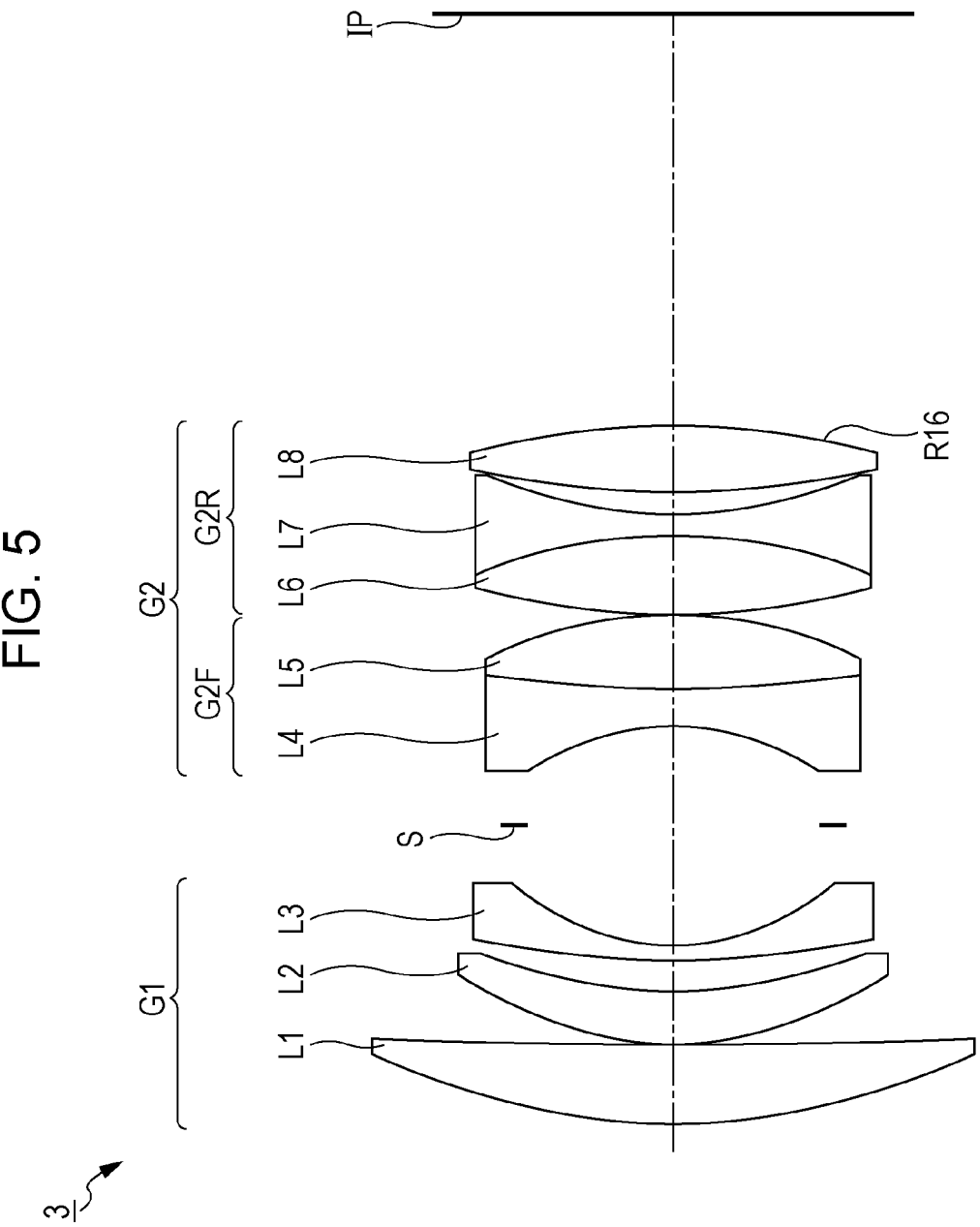
FIG. 5 is a view that shows a lens configuration of a third embodiment of an imaging lens.

FIG. 5 shows a lens configuration of an imaging lens 3 in a third embodiment of the present disclosure.

In the imaging lens 3, the first lens group G1 and the second lens group G2 are moved from the image side to the object side in a state in which a gap between the lens groups is constant on an optical axis when a subject distance changes from infinity to approach.

The first lens group G1 is configured by disposing a meniscus-shaped first lens L1 that has a positive refractive power, a convex surface of which faces the object side, a meniscus-shaped second lens L2 that has a positive refractive power, a concave surface of which faces the image side, and a meniscus-shaped third lens L3 that has a negative refractive power, a concave surface of which faces the image side, in order from the object side to the image side.

The second lens group G2 is configured by disposing an object side lens group 2GF and an image side lens group 2GR in order from the object side to the image side.

The object side lens group 2GF has a negative refractive power. The object side lens group 2GF is configured by a cemented lens in which a bioconcave fourth lens L4 that has a negative refractive power and a bioconvex fifth lens L5 that has a positive refractive power and is disposed on the image side of the fourth lens L4, are bonded.

The image side lens group 2GR has a positive refractive power. The image side lens group 2GR is configured by disposing a cemented lens in which a bioconvex sixth lens L6 that has a positive refractive power and a bioconcave seventh lens L7 that has a negative refractive power and is disposed on the image side of the sixth lens L6, are bonded, and a biconvex eighth lens L8 that has a positive refractive power, in order from the object side to the image side.

The aperture stop S is disposed between the first lens group G1 and the second lens group G2. The aperture stop S is moved integrally with the second lens group G2 from the image side to the object side when a subject distance changes from infinity to approach.

An image surface IP is disposed on the image side of the second lens group G2.

Table 7 shows lens data for a numerical example 3 in which specific numerical values are used in the imaging lens 3 of the third embodiment.

TABLE 7

| Surface Number | R | D | Nd | vd |
|---|---|---|---|---|
| 1 | 61.064 | 6.968 | 1.772500 | 49.6 |
| 2 | 514.332 | 0.200 | | |
| 3 | 32.939 | 4.600 | 1.910822 | 35.2 |
| 4 | 45.00 | 2.869 | | |
| 5 | 85.312 | 1.300 | 1.620040 | 36.3 |
| 6 | 21.512 | 10.869 | | |
| 7 | Infinity | 9.000 | | |
| 8 | −23.473 | 3.213 | 1.805181 | 25.4 |
| 9 | 100.000 | 6.804 | 1.830450 | 43.2 |
| 10 | −38.225 | 0.100 | | |
| 11 | 59.513 | 7.297 | 1.861181 | 39.6 |
| 12 | −45.000 | 1.924 | 1.603420 | 38.0 |
| 13 | 40.730 | 1.856 | | |
| 14 | 75.725 | 6.000 | 1.804200 | 46.5 |
| 15(ASP) | −62.169 | — | | |

In the imaging lens 3, an image side surface (a fifteenth surface) of the eighth lens L8 of the second lens group G2 is formed aspherically. The asphericity coefficients A4, A6, A8 and A10 of the fourth order, sixth order, eighth order, and tenth order of the aspherical surface in numerical example 3 are shown in Table 8 along with the conic constant κ thereof.

TABLE 8

| Surface Number | κ | A4 | A6 | A8 | A10 |
|---|---|---|---|---|---|
| 15 | 0.0000 | 2.59E−06 | 3.19E−10 | −1.39E−12 | 5.18E−15 |

A focal length f of the entire lens system when focused on an object at infinity, the F number Fno, the back focus BF and the half angle of view ω in numerical example 3 are shown in Table 9.

TABLE 9

| f | 50.3 |
|---|---|
| Fno | 1.44 |
| BF | 37.000 |
| ω | 23.70 |

Figure 6:
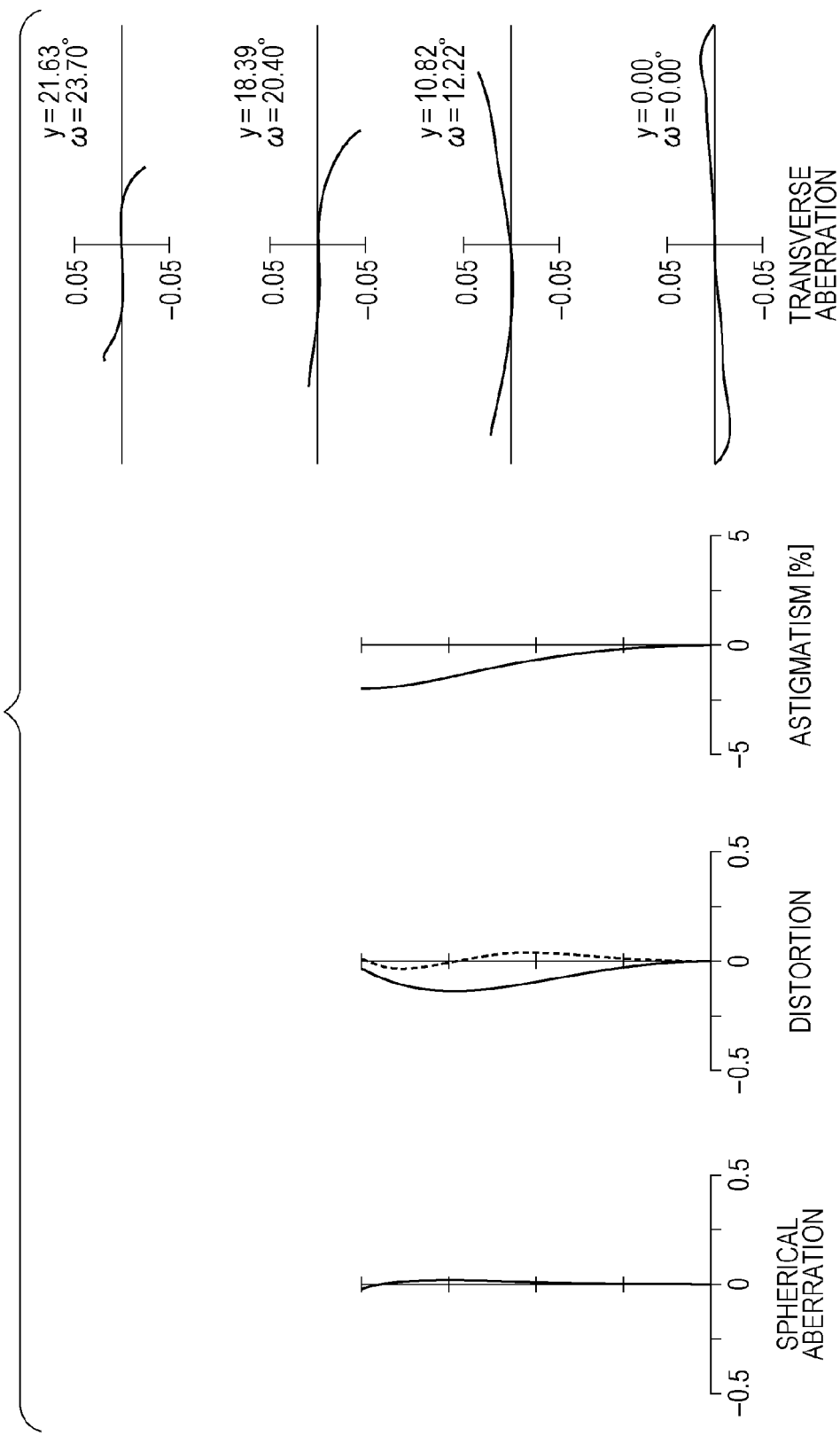
FIG. 6 is a view that shows spherical aberration, astigmatism, distortion and transverse aberration of numerical examples in which specific numerical values are used in the third embodiment.

FIG. 6 shows spherical aberration, astigmatism, distortion and transverse aberration when focused on an object at infinity in numerical example 3.

FIG. 6 shows a value of a d-line (587.56 nm) for spherical aberration, a value of a sagittal image surface of a d-line using a solid line and a value of a meridional image surface of a d-line using a dotted line for astigmatism, a value of a d-line for distortion, and a value of a d-line for transverse aberration. y indicates image height, and ω indicates a half angle of view for transverse aberration.

It is evident from each aberration drawing that various types of aberration are favorably corrected in numerical example 3 and that the numerical example has excellent imaging performance.

Fourth Embodiment

Figure 7:
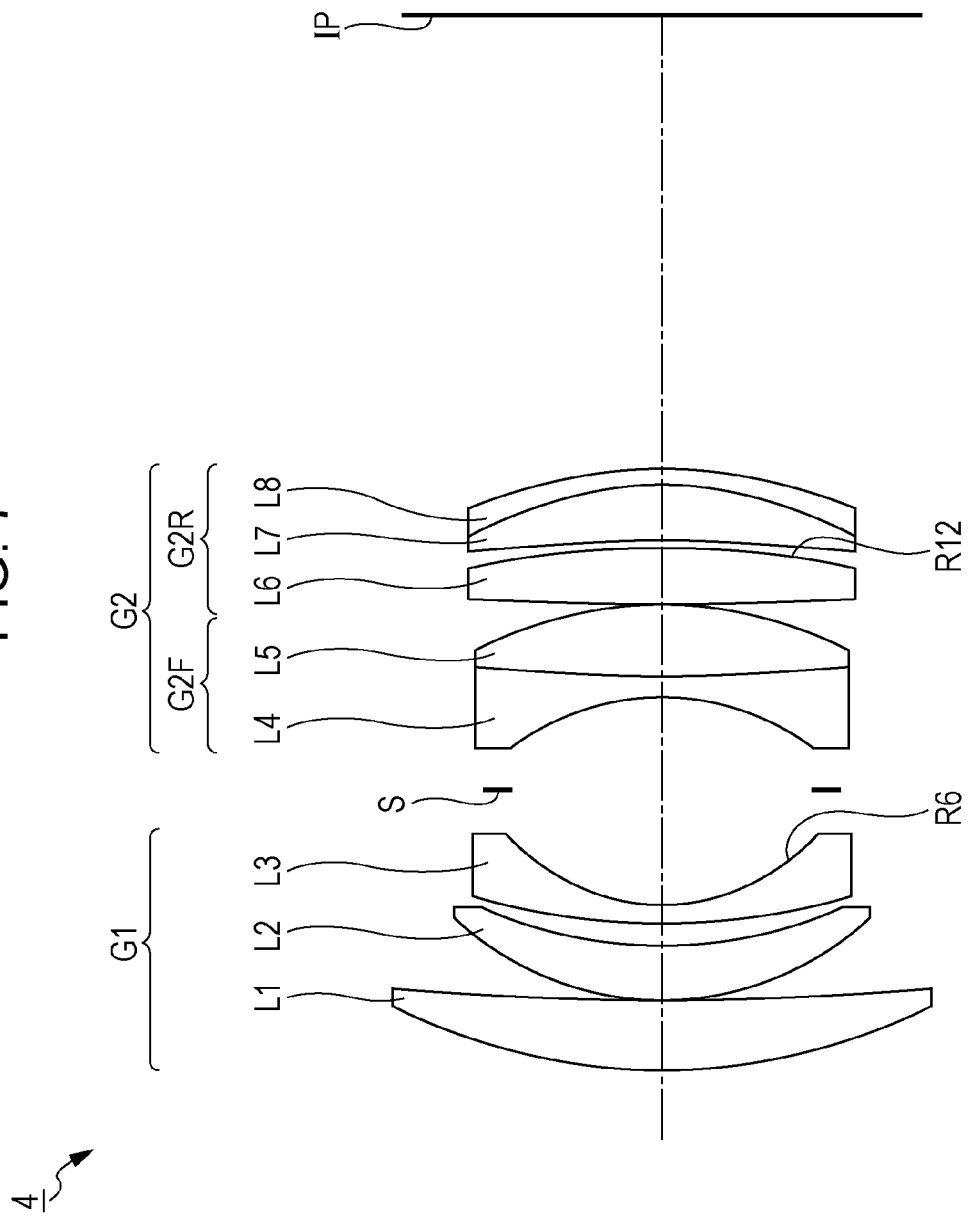
FIG. 7 is a view that shows a lens configuration of a fourth embodiment of an imaging lens.

FIG. 7 shows a lens configuration of an imaging lens 4 in a fourth embodiment of the present disclosure.

In the imaging lens 4, the first lens group G1 and the second lens group G2 are moved from the image side to the object side in a state in which a gap between the lens groups is constant on an optical axis when a subject distance changes from infinity to approach.

The first lens group G1 is configured by disposing a bioconvex first lens L1 that has a positive refractive power, a meniscus-shaped second lens L2 that has a positive refractive power, a concave surface of which faces the image side, and a meniscus-shaped third lens L3 that has a negative refractive power, a concave surface of which faces the image side, in order from the object side to the image side.

The second lens group G2 is configured by disposing an object side lens group 2GF and an image side lens group 2GR in order from the object side to the image side.

The object side lens group 2GF has a negative refractive power. The object side lens group 2GF is configured by a cemented lens in which a bioconcave fourth lens L4 that has a negative refractive power and a bioconvex fifth lens L5 that has a positive refractive power and is disposed on the image side of the fourth lens L4, are bonded.

The image side lens group 2GR has a positive refractive power. The image side lens group 2GR is configured by disposing a bioconvex sixth lens L6 that has a positive refractive power and a cemented lens in which a meniscus-shaped seventh lens L7 that has a positive refractive power, a convex surface of which faces the image side and a meniscus-shaped eighth lens L8 that has a negative refractive power, is disposed on the image side of the seventh lens L7 and a convex surface of which faces the image side, are bonded, in order from the object side to the image side.

The aperture stop S is disposed between the first lens group G1 and the second lens group G2. The aperture stop S is moved integrally with the second lens group G2 from the image side to the object side when a subject distance changes from infinity to approach.

An image surface IP is disposed on the image side of the second lens group G2.

Table 10 shows lens data for a numerical example 4 in which specific numerical values are used in the imaging lens 4 of the fourth embodiment.

TABLE 10

| Surface Number | R | D | Nd | νd |
|---|---|---|---|---|
| 1 | 49.765 | 5.861 | 1.834807 | 42.7 |
| 2 | 260.12 | 0.100 | | |
| 3 | 25.471 | 4.500 | 1.903660 | 35.5 |
| 4 | 39.023 | 1.800 | | |
| 5 | 57.837 | 1.600 | 1.761818 | 40.1 |
| 6(ASP) | 17.263 | 9.774 | | |
| 7 | Infinity | 7.652 | | |
| 8 | −21.469 | 1.800 | 1.846660 | 23.7 |
| 9 | 127.101 | 6.000 | 1.834810 | 42.7 |
| 10 | −33.598 | 0.200 | | |
| 11 | 891.958 | 4.500 | 1.910822 | 35.2 |
| 12(ASP) | −76.920 | 0.500 | | |
| 13 | −131.20 | 5.000 | 1.910822 | 35.2 |
| 14 | −31.165 | 1.500 | 1.786651 | 25.6 |
| 15 | −40.607 | — | | |

In the imaging lens 4, an image side surface (a sixth surface) of the third lens L3 of the first lens group G1 and an image side surface (a twelfth surface) of the sixth lens L6 of the second lens group G2 are formed aspherically. The asphericity coefficients A4, A6, A8 and A10 of the fourth order, sixth order, eighth order, and tenth order of the aspherical surfaces in numerical example 4 are shown in Table 11 along with the conic constants κ thereof.

TABLE 11

| Surface Number | κ | A4 | A6 | A8 | A10 |
|---|---|---|---|---|---|
| 6 | 0.0000 | −5.25E−07 | — | — | — |
| 12 | 0.0000 | 2.47E−06 | −2.40E−09 | 1.92E−11 | −4.33E−14 |

A focal length f of the entire lens system when focused on an object at infinity, the F number Fno, the back focus BF and the half angle of view ω in numerical example 4 are shown in Table 12.

TABLE 12

| f | 51.5 |
|---|---|
| Fno | 1.44 |
| BF | 37.800 |
| ω | 23.21 |

Figure 8:
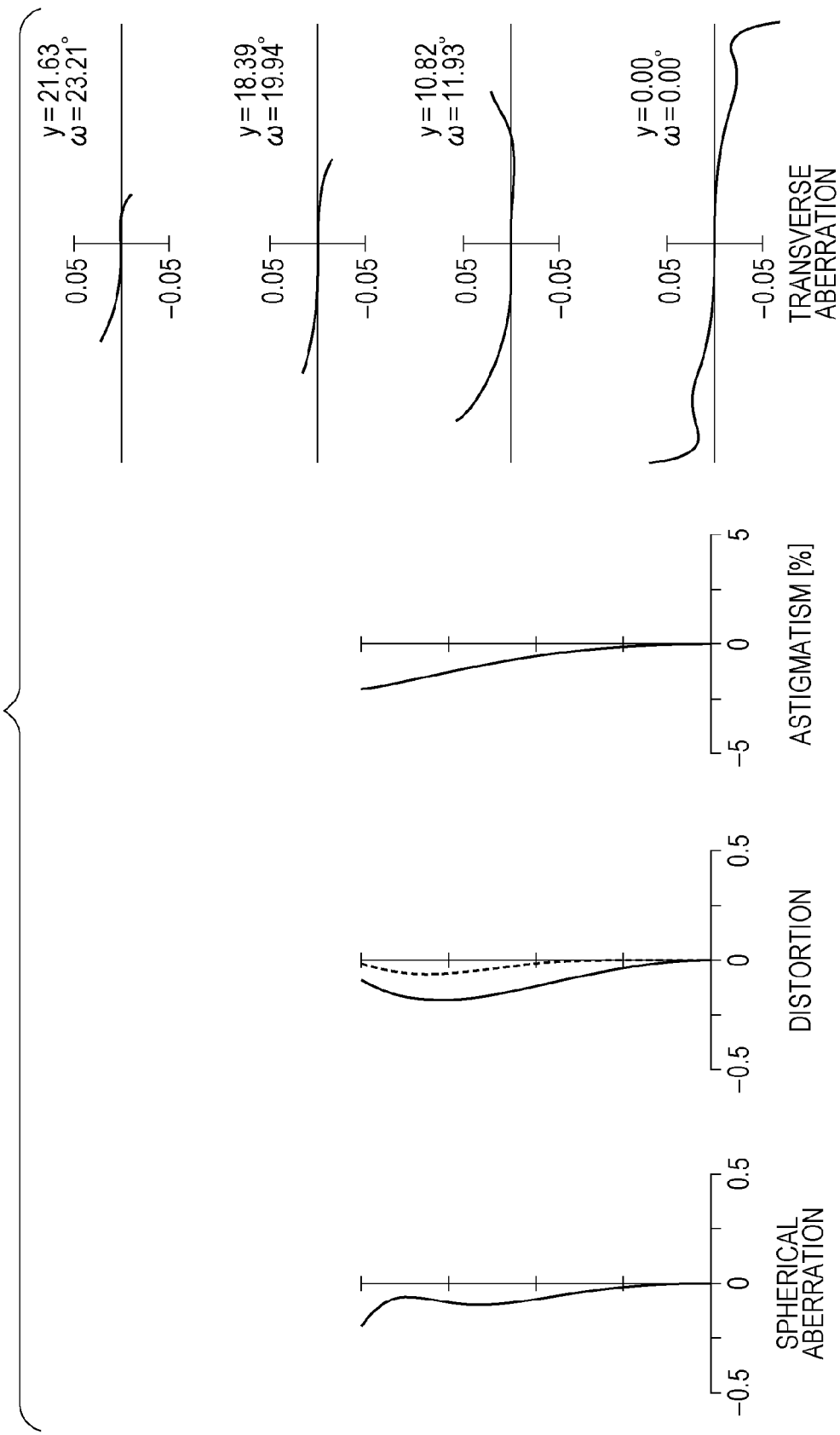
FIG. 8 is a view that shows spherical aberration, astigmatism, distortion and transverse aberration of numerical examples in which specific numerical values are used in the fourth embodiment.

FIG. 8 shows spherical aberration, astigmatism, distortion and transverse aberration when focused on an object at infinity in numerical example 4.

FIG. 8 shows a value of a d-line (587.56 nm) for spherical aberration, a value of a sagittal image surface of a d-line using a solid line and a value of a meridional image surface of a d-line using a dotted line for astigmatism, a value of a d-line for distortion, and a value of a d-line for transverse aberration. y indicates image height, and ω indicates a half angle of view for transverse aberration.

It is evident from each aberration drawing that various types of aberration are favorably corrected in numerical example 4 and that the numerical example has excellent imaging performance.

Fifth Embodiment

Figure 9:
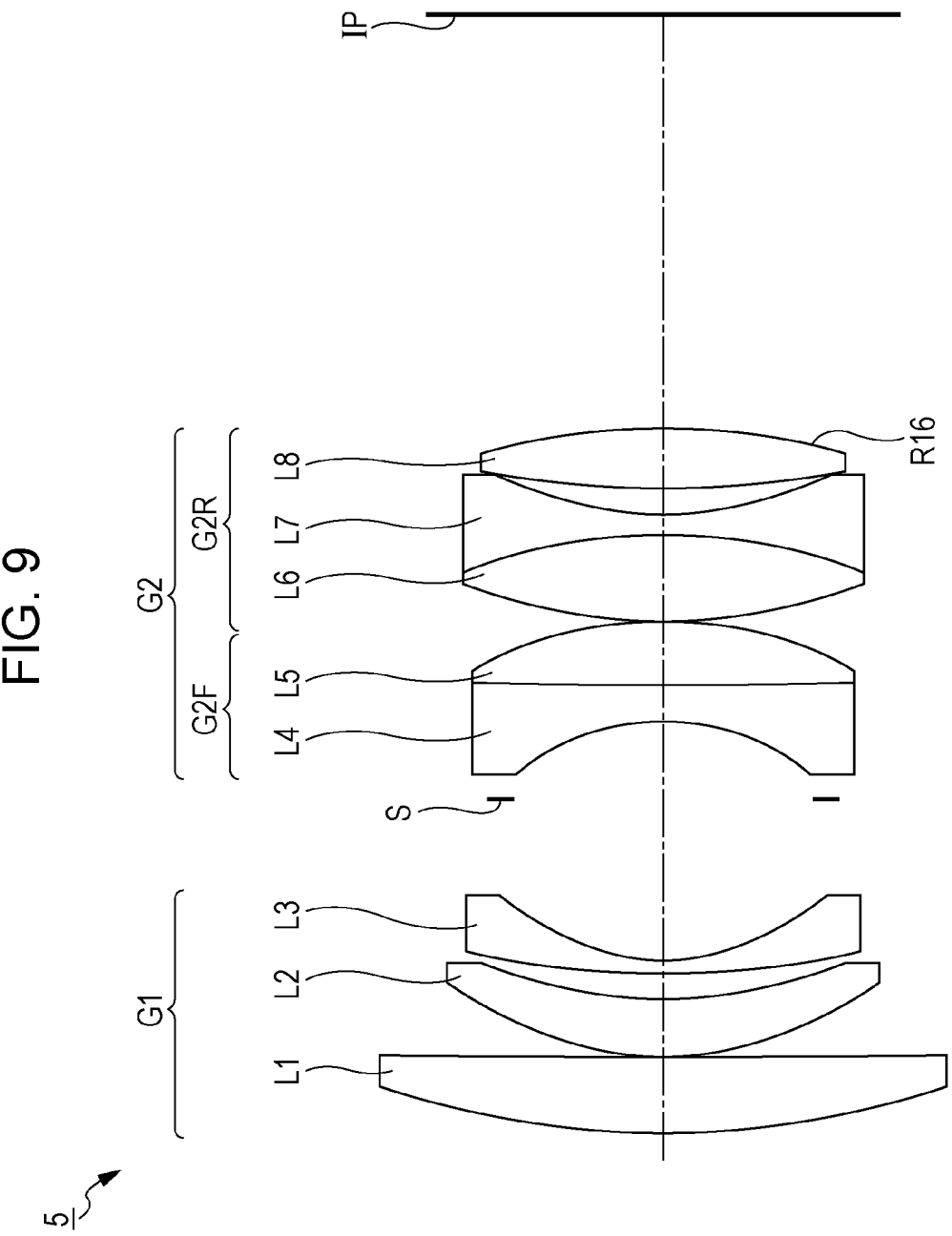
FIG. 9 is a view that shows a lens configuration of a fifth embodiment of an imaging lens.

FIG. 9 shows a lens configuration of an imaging lens 5 in a fifth embodiment of the present disclosure.

In the imaging lens 5, the first lens group G1 and the second lens group G2 are moved from the image side to the object side in a state in which a gap between the lens groups is constant on an optical axis when a subject distance changes from infinity to approach.

The first lens group G1 is configured by disposing a meniscus-shaped first lens L1 that has a positive refractive power, a convex surface of which faces the object side, a meniscus-shaped second lens L2 that has a positive refractive power, a concave surface of which faces the image side, and a meniscus-shaped third lens L3 that has a negative refractive power, a concave surface of which faces the image side, in order from the object side to the image side.

The second lens group G2 is configured by disposing an object side lens group 2GF and an image side lens group 2GR in order from the object side to the image side.

The object side lens group 2GF has a negative refractive power. The object side lens group 2GF is configured by a cemented lens in which a bioconcave fourth lens L4 that has a negative refractive power and a bioconvex fifth lens L5 that has a positive refractive power and is disposed on the image side of the fourth lens L4, are bonded.

The image side lens group 2GR has a positive refractive power. The image side lens group 2GR is configured by disposing a cemented lens in which a bioconvex sixth lens L6 that has a positive refractive power and a bioconcave seventh lens L7 that has a negative refractive power and is disposed on the image side of the sixth lens L6, are bonded, and bioconvex eighth lens L8 that has a positive refractive power, in order from the object side to the image side.

The aperture stop S is disposed between the first lens group G1 and the second lens group G2. The aperture stop S is moved integrally with the second lens group G2 from the image side to the object side when a subject distance changes from infinity to approach.

An image surface IP is disposed on the image side of the second lens group G2.

Table 13 shows lens data for a numerical example 5 in which specific numerical values are used in the imaging lens 5 of the fifth embodiment.

TABLE 13

| Surface Number | R | D | Nd | νd |
|---|---|---|---|---|
| 1 | 75.255 | 6.852 | 1.772500 | 49.6 |
| 2 | 1172.735 | 0.200 | | |
| 3 | 31.831 | 5.000 | 1.910822 | 35.2 |
| 4 | 42.789 | 2.348 | | |
| 5 | 82.956 | 1.300 | 1.620040 | 36.3 |
| 6 | 21.750 | 14.256 | | |
| 7 | Infinity | 7.000 | | |
| 8 | −22.334 | 3.213 | 1.761818 | 26.6 |
| 9 | 500.000 | 5.816 | 1.834805 | 42.7 |
| 10 | −35.431 | 0.100 | | |
| 11 | 45.958 | 7.831 | 1.834805 | 42.7 |
| 12 | −48.332 | 1.924 | 1.625880 | 35.7 |
| 13 | 34.937 | 2.179 | | |
| 14 | 80.520 | 5.428 | 1.804200 | 46.5 |
| 15(ASP) | −58.021 | — | | |

In the imaging lens 5, an image side surface (a fifteenth surface) of the eighth lens L8 of the second lens group G2 is formed aspherically. The asphericity coefficients A4, A6, A8 and A10 of the fourth order, sixth order, eighth order, and tenth order of the aspherical surface in numerical example 5 are shown in Table 14 along with the conic constant κ thereof.

TABLE 14

| Surface Number | κ | A4 | A6 | A8 | A10 |
|---|---|---|---|---|---|
| 15 | 0.0000 | 3.06E−06 | −2.98E−10 | 3.34E−12 | 3.01E−15 |

A focal length f of the entire lens system when focused on an object at infinity, the F number Fno, the back focus BF and the half angle of view ω in numerical example 5 are shown in Table 15.

TABLE 15

| f | 48.6 |
|---|---|
| Fno | 1.44 |
| BF | 37.000 |
| ω | 24.34 |

Figure 10:
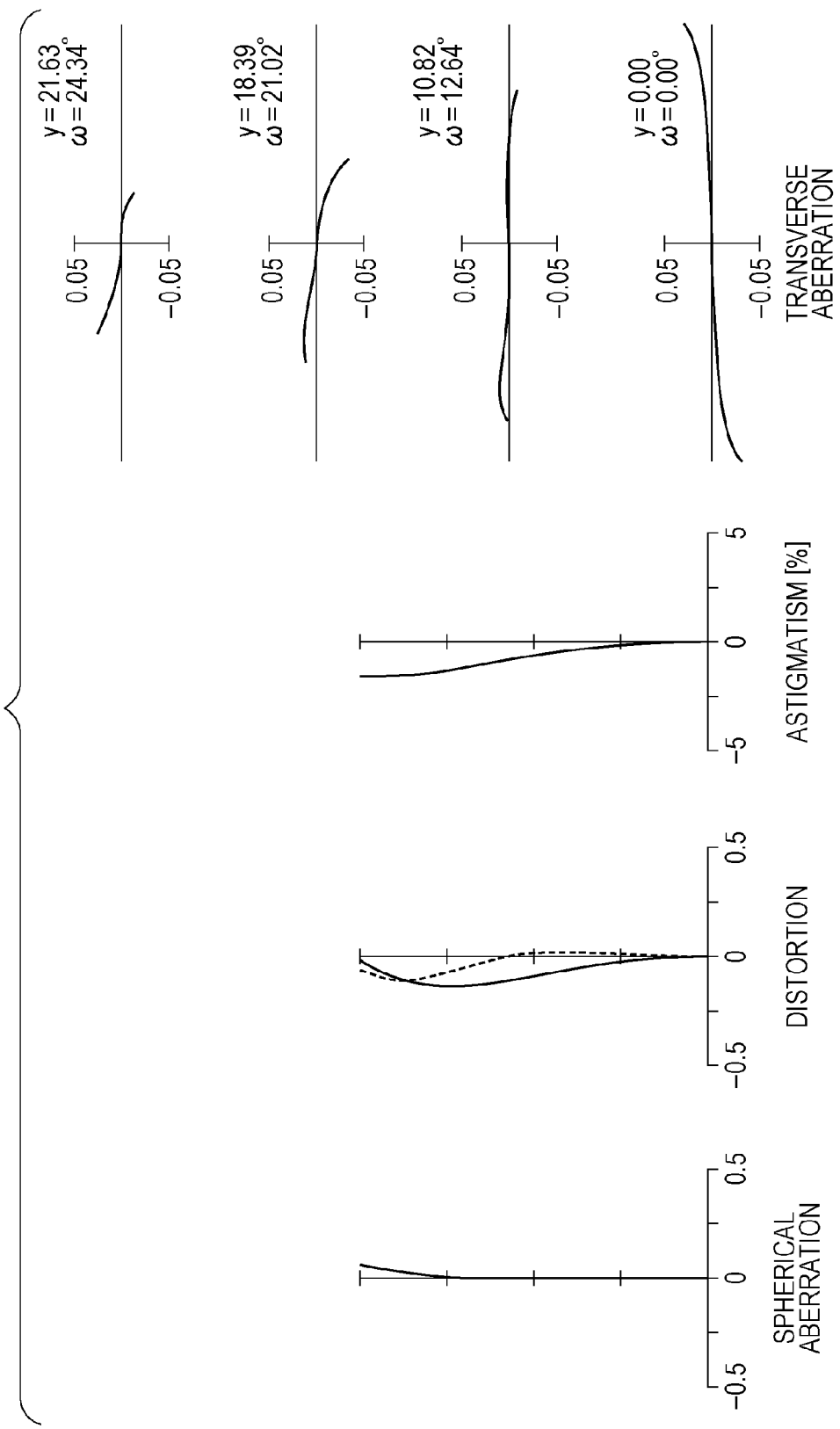
FIG. 10 is a view that shows spherical aberration, astigmatism, distortion and transverse aberration of numerical examples in which specific numerical values are used in the fifth embodiment.

FIG. 10 shows spherical aberration, astigmatism, distortion and transverse aberration when focused on an object at infinity in numerical example 5.

FIG. 10 shows a value of a d-line (587.56 nm) for spherical aberration, a value of a sagittal image surface of a d-line using a solid line and a value of a meridional image surface of a d-line using a dotted line for astigmatism, a value of a d-line for distortion, and a value of a d-line for transverse aberration. y indicates image height, and ω indicates a half angle of view for transverse aberration.

It is evident from each aberration drawing that various types of aberration are favorably corrected in numerical example 5 and that the numerical example has excellent imaging performance.

Sixth Embodiment

Figure 11:
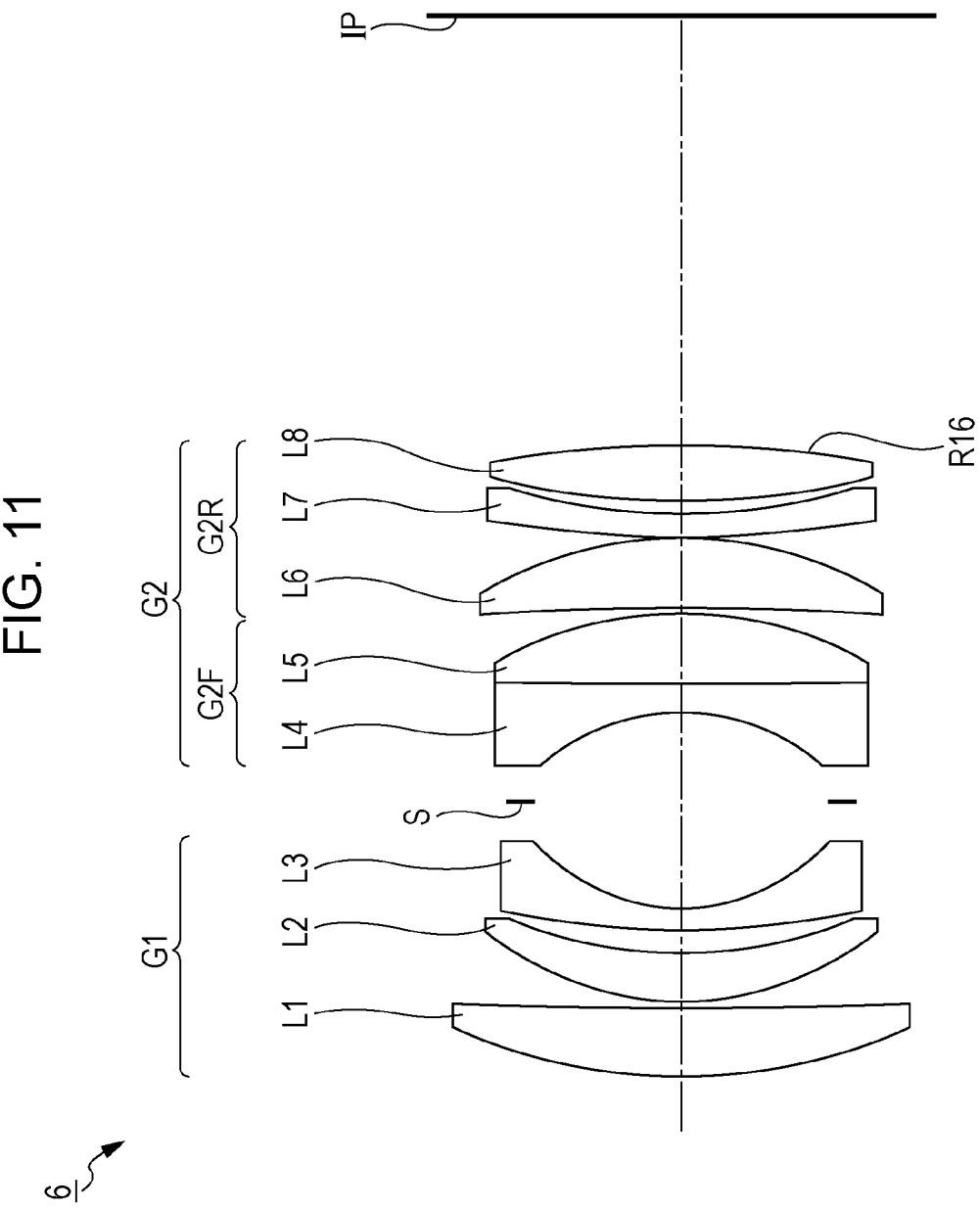
FIG. 11 is a view that shows a lens configuration of a sixth embodiment of an imaging lens.

FIG. 11 shows a lens configuration of an imaging lens 6 in a sixth embodiment of the present disclosure.

In the imaging lens 6, the first lens group G1 and the second lens group G2 are moved from the image side to the object side in a state in which a gap between the lens groups is constant on an optical axis when a subject distance changes from infinity to approach.

The first lens group G1 is configured by disposing a bioconvex first lens L1 that has a positive refractive power, a meniscus-shaped second lens L2 that has a positive refractive power, a concave surface of which faces the image side, and a meniscus-shaped third lens L3 that has a negative refractive power, a concave surface of which faces the image side, in order from the object side to the image side.

The second lens group G2 is configured by disposing an object side lens group 2GF and an image side lens group 2GR in order from the object side to the image side.

The object side lens group 2GF has a negative refractive power. The object side lens group 2GF is configured by a cemented lens in which a bioconcave fourth lens L4 that has a negative refractive power and a bioconvex fifth lens L5 that has a positive refractive power and is disposed on the image side of the fourth lens L4, are bonded.

The image side lens group 2GR has a positive refractive power. The image side lens group 2GR is configured by disposing a meniscus-shaped sixth lens L6 that has a positive refractive power, a convex surface of which faces the image side, a meniscus-shaped seventh lens L7 that has a negative refractive power, a convex surface of which faces the object side, and bioconvex eighth lens L8 that has a positive refractive power, in order from the object side to the image side.

The aperture stop S is disposed between the first lens group G1 and the second lens group G2. The aperture stop S is moved integrally with the second lens group G2 from the image side to the object side when a subject distance changes from infinity to approach.

An image surface IP is disposed on the image side of the second lens group G2.

Table 16 shows lens data for a numerical example 6 in which specific numerical values are used in the imaging lens 6 of the sixth embodiment.

TABLE 16

| Surface Number | R | D | Nd | νd |
|---|---|---|---|---|
| 1 | 46.219 | 5.995 | 1.785420 | 47.9 |
| 2 | 507.560 | 0.500 | | |
| 3 | 25.360 | 4.222 | 1.743972 | 44.8 |
| 4 | 36.253 | 2.021 | | |
| 5 | 62.808 | 2.000 | 1.620212 | 36.3 |
| 6 | 16.916 | 9.300 | | |
| 7 | Infinity | 7.700 | | |
| 8 | −18.800 | 2.505 | 1.805181 | 25.4 |
| 9 | 491.055 | 6.156 | 1.834810 | 42.7 |
| 10 | −33.024 | 0.500 | | |
| 11 | −249.480 | 5.969 | 1.744331 | 43.9 |
| 12 | −34.996 | 0.500 | | |
| 13 | 96.430 | 1.960 | 1.706880 | 29.8 |
| 14 | 49.849 | 1.007 | | |
| 15 | 63.547 | 4.857 | 1.743972 | 44.8 |
| 16(ASP) | −104.530 | — | | |

In the imaging lens 6, an image side surface (a sixteenth surface) of the eighth lens L8 of the second lens group G2 is formed aspherically. The asphericity coefficients A4, A6, A8 and A10 of the fourth order, sixth order, eighth order, and tenth order of the aspherical surface in numerical example 6 are shown in Table 17 along with the conic constant κ thereof.

TABLE 17

| Surface Number | κ | A4 | A6 |
|---|---|---|---|
| 16 | 0.0000 | 3.40E−07 | −6.46E−10 |

A focal length f of the entire lens system when focused on an object at infinity, the F number Fno, the back focus BF and the half angle of view ω in numerical example 6 are shown in Table 18.

TABLE 18

| f | 50.5 |
|---|---|
| Fno | 1.43 |
| BF | 37.255 |
| ω | 23.66 |

Figure 12:
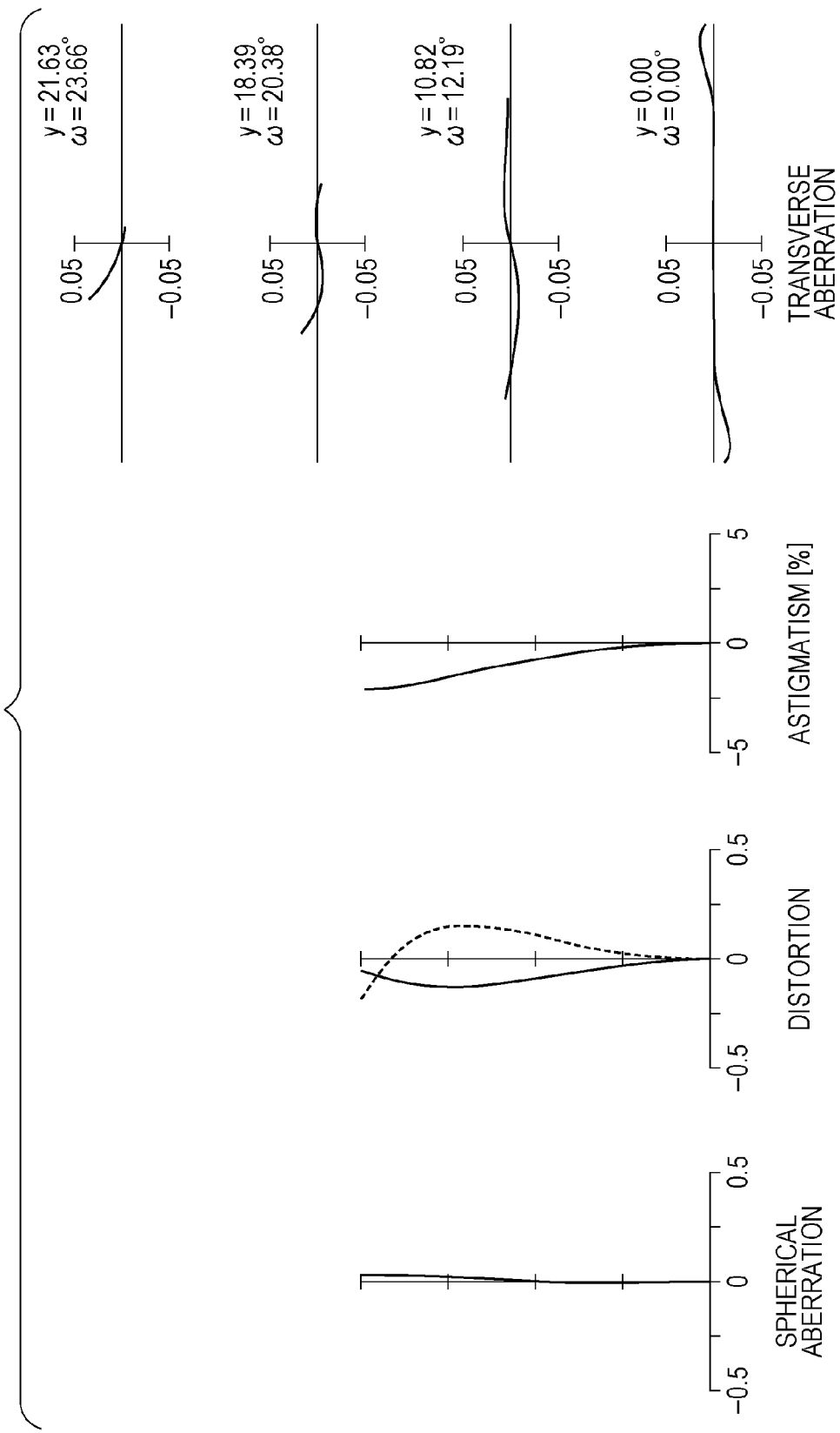
FIG. 12 is a view that shows spherical aberration, astigmatism, distortion and transverse aberration of numerical examples in which specific numerical values are used in the sixth embodiment.

FIG. 12 shows spherical aberration, astigmatism, distortion and transverse aberration when focused on an object at infinity in numerical example 6.

FIG. 12 shows a value of a d-line (587.56 nm) for spherical aberration, a value of a sagittal image surface of a d-line using a solid line and a value of a meridional image surface of a d-line using a dotted line for astigmatism, a value of a d-line for distortion, and a value of a d-line for transverse aberration. y indicates image height, and ω indicates a half angle of view for transverse aberration.

It is evident from each aberration drawing that various types of aberration are favorably corrected in numerical example 6 and that the numerical example has excellent imaging performance.

Values of Conditional Expressions of Imaging Lenses

Hereinafter, values for the conditional expressions of the imaging lenses of the present disclosure will be described.

Table 19 shows values for conditional expression (1) and conditional expression (2) in numerical example 1 to numerical example 6 of imaging lens 1 to imaging lens 6.

second lens group are moved from the image side to the object side in a state in which a gap between the lens groups is constant on an optical axis when a subject distance changes from infinity to approach.

In addition, in the imaging lens of the imaging device of the present disclosure, the second lens group is configured by at least two negative lenses and at least three positive lenses and the imaging lens satisfies the following conditional expression (1).

$$0.01 < f2/f1 < 0.23 \quad (1)$$

where,
f1: focal length of the first lens group when focused on an object at infinity
f2: focal length of the second lens group when focused on an object at infinity Conditional expression (1) defines a ratio of the focal length of the second lens group when focused on an object at infinity with respect to the focal length of the first lens group when focused on an object at infinity.

If the ratio falls below a lower limit of conditional expression (1), the refractive power of the second lens group is too strong and the correction of comatic aberration is difficult. In addition, as a result of the refractive power of the second lens group being too strong, light rays are greatly bent, sensitivity is high, and the difficulty in the assembly of the lens is increased due to a high precision assembly technique being necessary.

Conversely, if the ratio exceeds an upper limit of conditional expression (1), the refractive power of the first lens group is too strong and the correction of spherical aberration is difficult. In addition, since the refractive power of the second lens group is relatively weak, the correction of field curvature is also difficult.

Therefore, as a result of the imaging lens of the imaging device satisfying conditional expression (1), the respective refractive powers of the first lens group and the second lens group can be adjusted, it is possible to favorably correct comatic aberration, spherical aberration and field curvature, and it is possible to achieve simplification of assembly.

Additionally, it is preferable that the imaging lens satisfy the following conditional expression (1)'.

$$0.05 < f2/f1 < 0.23 \quad (1)'$$

TABLE 19

|  |  | Example 1 | Example 2 | Example 3 | Example 4 | Example 5 | Example 6 |
|---|---|---|---|---|---|---|---|
| | f2 | 40.47 | 40.90 | 39.82 | 40.81 | 38.98 | 39.24 |
| | f1 | 324.81 | 190.00 | 289.90 | 190.00 | 473.24 | 214.56 |
| Conditional Expression (1) | 0.01 < f2/f1 < 0.23 | 0.12 | 0.22 | 0.14 | 0.21 | 0.08 | 0.18 |
| | f2F | −204.28 | −86.14 | −118.87 | −95.07 | −153.33 | −80.93 |
| Conditional Expression (2) | −6.0 < f2F/f2 < −1.0 | −5.05 | −2.11 | −2.99 | −2.33 | −3.93 | −2.06 |

As is evident from Table 19, imaging lens 1 to imaging lens 6 satisfy conditional expression (1) and conditional expression (2).

Configuration of Imaging Device

An imaging lens of an imaging device of the present disclosure is configured by disposing a first lens group that has a positive refractive power, an aperture stop, and a second lens group that has a positive refractive power in order from an object side to an image side, and the first lens group and the As a result of the imaging lens satisfying conditional expression (1)', the respective refractive powers of the first lens group and the second lens group can be further adjusted, it is possible to further favorably correct comatic aberration, spherical aberration and field curvature, and it is possible to achieve further simplification of assembly.

An imaging lens of an imaging device according to another embodiment of the present disclosure is configured by disposing a first lens group that has a positive refractive power, an aperture stop, and a second lens group that has a positive refractive power in order from an object side to an image side, and the first lens group and the second lens group are moved from the image side to the object side in a state in which a gap between the lens groups is constant on an optical axis when a subject distance changes from infinity to approach.

In addition, in the imaging lens of the imaging device according to another embodiment of the present disclosure, the second lens group is configured by an object side lens group that is a cemented lens having a negative refractive power, and an image side lens group that has a positive refractive power that are disposed in order from the object side to the image side, and the image side lens group is configured by two positive lenses and one negative lens.

As a result of the second lens group being configured by an object side lens group that is a cemented lens having a negative refractive power, and an image side lens group that has a positive refractive power that are disposed in order from the object side to the image side, in addition to securing a sufficient amount of back focus necessary in a single-lens reflex camera, comatic aberration and field curvature can be favorably corrected.

In addition, it is possible to favorably correct high-level spherical aberration by configuring the object side lens group that is close to the aperture stop as a cemented lens.

Embodiment of Imaging Device

Figure 13:
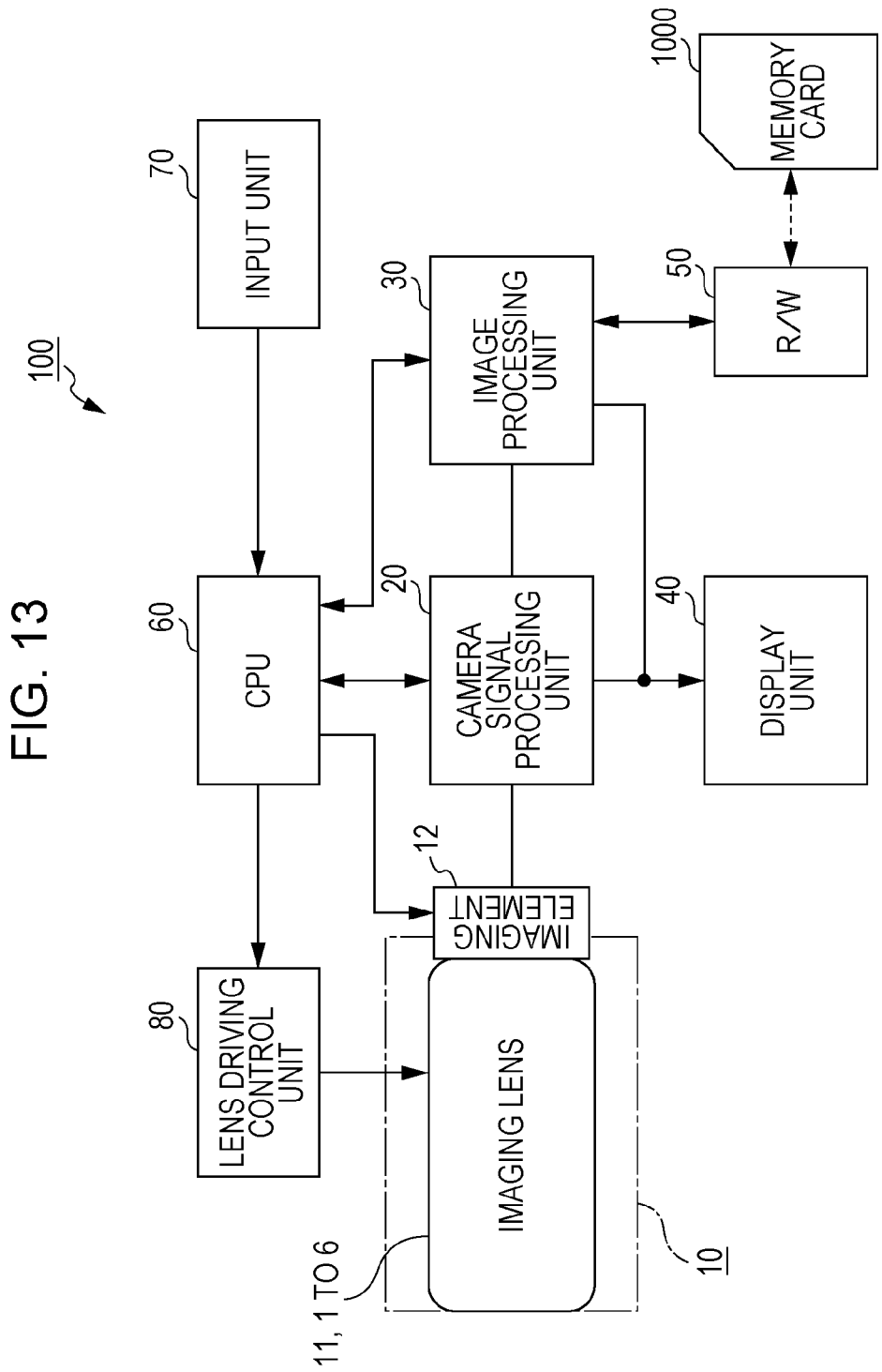
FIG. 13 is a block diagram that shows an example of an imaging device.

FIG. 13 shows a block diagram of an interchangeable lens digital camera according to an embodiment of an imaging device of the present disclosure.

An imaging device (digital camera) 100 has a camera block 10 that performs an imaging function, a camera signal processing unit 20 that performs signal processes such as analog-digital conversion of captured image signals, and an image processing unit 30 that performs record and playback processes of image signals. In addition, the imaging device 100 is provided with a display unit 40 such as an LCD (Liquid Crystal Display) that displays captured images and the like, an R/W (reader/writer) 50 that performs writing and reading of image signals to a memory card 1000, a CPU (Central Processing Unit) 60 that controls the entire imaging device, an input unit 70 that is formed from various switches and the like using which necessary operations are performed by a user, and a lens driving control unit 80 that controls the driving of the lenses disposed in the camera block 10.

The camera block 10 is for example, provided with an interchangeable lens, and is configured by an optical system that includes an imaging lens 11 (imaging lens 1 to imaging lens 6 in which the present disclosure is used) and an imaging element 12 such as a CCD (Charge Coupled Device) or a CMOS (Complementary Metal Oxide Semiconductor).

The camera signal processing unit 20 performs various signal processes on an output signal from the imaging element 12 such as conversion into a digital signal, noise reduction, image quality correction, and conversion into luminance/color difference signal.

The image processing unit 30 performs compression encoding and expansion decoding of image signals and conversion processes of the data specifications such as resolution on the basis of a predetermined image data format.

The display unit 40 has a function of displaying the operational state of a user with respect to the input unit 70 and various types of data for captured images and the like.

The R/W 50 performs writing of image data encoded by the image processing unit 30 to the memory card 1000 and reading of image data recorded on the memory card 1000.

The CPU 60 functions as a control processing unit that controls each circuit block that is provided in the imaging device 100, and controls each circuit block on the basis of instruction input signals from the input unit 70.

The input unit 70 is for example, configured by a shutter release button for performing operation of a shutter, a selection switch for selecting an operation mode and the like, and outputs an instruction input signal to the CPU 60 depending on the operation of a user.

The lens driving control unit 80 controls a motor (not shown in the drawing) or the like that drives each lens of the imaging lens 11 on the basis of a control signal from the CPU 60.

The memory card 1000 is for example, semiconductor memory that is detachable from a slot that is connected to the R/W 50.

Hereinafter, the operation of the imaging device 100 will be described.

In an image capture standby state, image signals captured in the camera block 10 are output to the display unit 40 through the camera signal processing unit 20 and displayed as through-the-lens images under the control of the CPU 60. In addition, if an instruction input signal for zooming is input from the input unit 70, the CPU 60 outputs a control signal to the lens driving control unit 80, and predetermined lenses of the imaging lens 11 are moved on the basis of the control of the lens driving control unit 80.

If the shutter (not shown in the drawing) of the camera block 10 is activated by an instruction input signal from the input unit 70, captured image signals are output to the image processing unit 30 from the camera signal processing unit 20, compression encoded, and converted into digital data of a predetermined data format. The converted data is output to the R/W 50 and written to the memory card 1000.

Focusing is for example, performed by the lens driving control unit 80 moving predetermined lenses of the imaging lens 11 on the basis of control signals from the CPU 60 in a case in which the shutter release button of the input unit 70 is half pressed, fully pressed in order to record (capture an image) or the like.

In a case in which image data that is recorded on the memory card 1000 is played back, predetermined image data is read from the memory card 1000 by the R/W 50 depending on the operation of the input unit 70, and after expansion decoding has been performed by the image processing unit 30, a playback image is displayed by outputting a playback image signal to the display unit 40.

Other Variations

In the imaging lenses and the imaging device of the present disclosure, other optical elements such as lenses that do not have refractive power and an aperture stop may be disposed in addition to the first lens group G1 and the second lens group G2. In such a case, the lens configuration of the imaging lenses of the present disclosure is substantively configured by lens configurations of two groups of the first lens group and the second lens group.

Present Disclosure

It is possible for the embodiments of the present disclosure to have the following configurations.

<1>

An imaging lens that satisfies the following conditional expression (1) and is configured by disposing a first lens group that has a positive refractive power, an aperture stop, and a second lens group that has a positive refractive power in order from an object side to an image side, in which the first lens group and the second lens group are moved from the image side to the object side in a state in which a gap between the lens groups is constant on an optical axis when a subject distance changes from infinity to approach, and the second lens group is configured by at least two negative lenses and at least three positive lenses.

$$0.01 < f2/f1 < 0.23 \quad (1)$$

where,
f1: focal length of the first lens group when focused on an object at infinity
f2: focal length of the second lens group when focused on an object at infinity <2>
The imaging lens according to <1>, in which the second lens group is configured by an object side lens group that is a cemented lens having a negative refractive power, and an image side lens group that has a positive refractive power that are disposed in order from the object side to the image side.

<3>
The imaging lens according to <2>, in which the object side lens group is configured by a negative lens and a positive lens that are disposed in order from the object side to the image side.

<4>
The imaging lens according to <2> or <3>, in which the image side lens group is configured by two positive lenses and one negative lens.

<5>
The imaging lens according to any one of <2> to <4> that satisfies the following conditional expression (2).

$$-6.0 < f2F/f2 < -1.0 \quad (2)$$

where,
f2F: focal length of the object side lens group when focused on an object at infinity <6>
The imaging lens according to any one of <1> to <5>, in which at least one aspherical lens is included in the second lens group.

<7>
An imaging lens that is configured by disposing a first lens group that has a positive refractive power, an aperture stop, and a second lens group that has a positive refractive power in order from an object side to an image side, in which the first lens group and the second lens group are moved from the image side to the object side in a state in which a gap between the lens groups is constant on an optical axis when a subject distance changes from infinity to approach, and the second lens group is configured by an object side lens group that is a cemented lens having a negative refractive power, and an image side lens group that has a positive refractive power that are disposed in order from the object side to the image side, and the image side lens group is configured by two positive lenses and one negative lens.

<8>
An imaging device that includes an imaging lens and an imaging element that converts an optical image formed by the imaging lens into an electrical signal, in which the imaging lens satisfies the following conditional expression (1), and is configured by disposing a first lens group that has a positive refractive power, an aperture stop, and a second lens group that has a positive refractive power in order from an object side to an image side, the first lens group and the second lens group are moved from the image side to the object side in a state in which a gap between the lens groups is constant on an optical axis when a subject distance changes from infinity to approach, and the second lens group is configured by at least two negative lenses and at least three positive lenses.

$$0.01 < f2/f1 < 0.23 \quad (1)$$

where,
f1: focal length of the first lens group when focused on an object at infinity
f2: focal length of the second lens group when focused on an object at infinity <9>
An imaging device that includes an imaging lens and an imaging element that converts an optical image formed by the imaging lens into an electrical signal, in which the imaging lens is configured by disposing a first lens group that has a positive refractive power, an aperture stop, and a second lens group that has a positive refractive power in order from an object side to an image side, the first lens group and the second lens group are moved from the image side to the object side in a state in which a gap between the lens groups is constant on an optical axis when a subject distance changes from infinity to approach, the second lens group is configured by an object side lens group that is a cemented lens having a negative refractive power, and an image side lens group that has a positive refractive power that are disposed in order from the object side to the image side, and the image side lens group is configured by two positive lenses and one negative lens.

The forms and numerical values of each part shown in each of the abovementioned embodiments merely indicate materializations when implementing the embodiments according to the present disclosure by way of example and are not intended to limit the technical scope of the embodiments according to the present disclosure.

The present disclosure contains subject matter related to that disclosed in Japanese Priority Patent Application JP 2012-220629 filed in the Japan Patent Office on Oct. 2, 2012, the entire contents of which are hereby incorporated by reference.

What is claimed is:

1. An imaging lens that satisfies the following conditional expression (1) and is configured by disposing a first lens group that has a positive refractive power, an aperture stop, and a second lens group that has a positive refractive power in order from an object side to an image side,
    wherein the first lens group and the second lens group are moved from the image side to the object side in a state in which a gap between the lens groups is constant on an optical axis when a subject distance changes from infinity to approach, and
    the second lens group is configured by at least two negative lenses and at least three positive lenses $$0.01 < f2/f1 < 0.23 \quad (1)$$

where,
    f1: focal length of the first lens group when focused on an object at infinity
    f2: focal length of the second lens group when focused on an object at infinity.

2. The imaging lens according to claim 1,
    wherein the second lens group is configured by an object side lens group that is a cemented lens having a negative refractive power, and an image side lens group that has a positive refractive power that are disposed in order from the object side to the image side.

3. The imaging lens according to claim 2,
    wherein the object side lens group is configured by a negative lens and a positive lens that are disposed in order from the object side to the image side.

4. The imaging lens according to claim 2,
    wherein the image side lens group is configured by two positive lenses and one negative lens.

5. The imaging lens according to claim 2 that satisfies the following conditional expression (2)

$$-6.0 < f2F/f2 < -1.0 \qquad (2)$$

where, f2F: focal length of the object side lens group when focused on an object at infinity.

6. The imaging lens according to claim 1,
wherein at least one aspherical lens is included in the second lens group.

7. An imaging lens that is configured by disposing a first lens group that has a positive refractive power, an aperture stop, and a second lens group that has a positive refractive power in order from an object side to an image side,
wherein the first lens group and the second lens group are moved from the image side to the object side in a state in which a gap between the lens groups is constant on an optical axis when a subject distance changes from infinity to approach,
the second lens group is configured by an object side lens group that is a cemented lens having a negative refractive power, and an image side lens group that has a positive refractive power that are disposed in order from the object side to the image side, and
the image side lens group is configured by two positive lenses and one negative lens.

8. An imaging device comprising:
an imaging lens; and
an imaging element that converts an optical image formed by the imaging lens into an electrical signal,
wherein the imaging lens satisfies the following conditional expression (1), and is configured by disposing a first lens group that has a positive refractive power, an aperture stop, and a second lens group that has a positive refractive power in order from an object side to an image side,
the first lens group and the second lens group are moved from the image side to the object side in a state in which a gap between the lens groups is constant on an optical axis when a subject distance changes from infinity to approach, and
the second lens group is configured by at least two negative lenses and at least three positive lenses $$0.01 < f2/f1 < 0.23 \qquad (1)$$

where, f1: focal length of the first lens group when focused on an object at infinity f2: focal length of the second lens group when focused on an object at infinity.

9. An imaging device comprising:
an imaging lens; and
an imaging element that converts an optical image formed by the imaging lens into an electrical signal,
wherein the imaging lens is configured by disposing a first lens group that has a positive refractive power, an aperture stop, and a second lens group that has a positive refractive power in order from an object side to an image side,
the first lens group and the second lens group are moved from the image side to the object side in a state in which a gap between the lens groups is constant on an optical axis when a subject distance changes from infinity to approach,
the second lens group is configured by an object side lens group that is a cemented lens having a negative refractive power, and an image side lens group that has a positive refractive power that are disposed in order from the object side to the image side, and
the image side lens group is configured by two positive lenses and one negative lens.

* * * * *